United States Patent
Decker et al.

(10) Patent No.: US 11,040,892 B2
(45) Date of Patent: Jun. 22, 2021

(54) SPA/POOL WATER TREATMENT SYSTEM AND METHOD

(71) Applicant: Digital Concepts of Missouri, Inc., Maryland Heights, MO (US)

(72) Inventors: Paul Decker, Creve Coeur, MO (US); Jack Greenwood, St. Peters, MO (US)

(73) Assignee: Digital Concepts of Missouri, Inc., Maryland Heights, MO (US)

( * ) Notice: Subject to any disclaimer, the term of this patent is extended or adjusted under 35 U.S.C. 154(b) by 339 days.

(21) Appl. No.: 16/000,246

(22) Filed: Jun. 5, 2018

(65) Prior Publication Data
US 2018/0297863 A1 Oct. 18, 2018

Related U.S. Application Data

(63) Continuation-in-part of application No. 15/019,236, filed on Feb. 9, 2016, now Pat. No. 9,990,560.
(Continued)

(51) Int. Cl.
*C02F 1/00* (2006.01)
*C02F 1/68* (2006.01)
(Continued)

(52) U.S. Cl.
CPC ............ *C02F 1/008* (2013.01); *C02F 1/685* (2013.01); *C02F 1/688* (2013.01); *C02F 1/76* (2013.01); *E04H 4/1281* (2013.01); *C02F 2103/42* (2013.01); *C02F 2209/006* (2013.01); *C02F 2209/008* (2013.01); *C02F 2209/055* (2013.01); *C02F 2209/06* (2013.01); *C02F 2209/07* (2013.01); *C02F 2209/29* (2013.01); *C02F 2303/185* (2013.01)

(58) Field of Classification Search
CPC .......... C02F 1/008; C02F 1/688; C02F 1/685; C02F 1/76; C02F 2209/07; C02F 2303/185; C02F 2209/006; C02F 2209/055; C02F 2209/29; C02F 2209/06; C02F 2103/42; C02F 2209/008; E04H 4/1281
USPC ....................................................... 422/552
See application file for complete search history.

(56) References Cited

U.S. PATENT DOCUMENTS 4,328,184 A 5/1982 Kondo
4,476,149 A 10/1984 Poppe et al.
(Continued)

FOREIGN PATENT DOCUMENTS

GB 2516378 * 1/2016
WO 2011/141908 A2 11/2011

OTHER PUBLICATIONS

LaMotte "Mobile WaterLink Spin" http://www.lamotte.com/en/pool-spa/digital-testing/3577.html, Mar. 9, 2015, 2 pages.
(Continued)

*Primary Examiner* — Benjamin R Whatley
*Assistant Examiner* — Jacqueline Brazin
(74) *Attorney, Agent, or Firm* — Stinson LLP

(57) ABSTRACT

A mobile device reads a test strip to determine a chemical condition of a liquid or a user inputs a treatment plan into the mobile device. The mobile device transmits the determined chemical condition or the input treatment plan to a liquid treatment system which treats the fluid in response to the determined chemical condition or the input treatment plan.

20 Claims, 21 Drawing Sheets

Related U.S. Application Data

(60) Provisional application No. 62/620,190, filed on Jan. 22, 2018, provisional application No. 62/113,799, filed on Feb. 9, 2015.

(51) Int. Cl.
*C02F 1/76* (2006.01)
*E04H 4/12* (2006.01)
*C02F 103/42* (2006.01)

(56) References Cited

U.S. PATENT DOCUMENTS

| | | |
|---|---|---|
| 4,510,383 A | 4/1985 | Ruppender |
| 7,118,875 B2 | 10/2006 | Klepp et al. |
| 8,145,431 B2 | 3/2012 | Kloepfer et al. |
| 8,734,734 B2 | 5/2014 | Kido et al. |
| 8,797,180 B2 | 8/2014 | Weintraub et al. |
| 8,824,800 B2 | 9/2014 | Bremnes et al. |
| 9,776,888 B1 * | 10/2017 | Kurani ............... C02F 1/66 |
| 2006/0140818 A1 | 6/2006 | Sakamoto et al. |
| 2010/0159611 A1 | 6/2010 | Song et al. |
| 2010/0254581 A1 | 10/2010 | Neeser et al. |
| 2011/0111522 A1 * | 5/2011 | Zimmerie ........ G01N 35/00732 436/501 |
| 2014/0017802 A1 | 1/2014 | Smith |
| 2014/0072189 A1 | 3/2014 | Jena et al. |
| 2014/0107939 A1 | 4/2014 | Jaunakais et al. |
| 2014/0212336 A1 | 7/2014 | Kido et al. |
| 2014/0246334 A1 | 9/2014 | Bosch et al. |
| 2015/0029037 A1 | 1/2015 | Weintraub et al. |
| 2016/0216285 A1 | 7/2016 | Takai et al. |

OTHER PUBLICATIONS

LaMotte "Insta-Test Pool and Spa Test Strips" http://www.lamotte.com/en/pool-spa/insta-test?tab=Pool%20and%20Spa%20Test%20Strips, Mar. 9, 2015, 3 pages.

ITunes Clorox Test Strip App, https://itunes.apple.com/us/app/clorox-pool/id957130735?mt=8, printed May 31, 2017 (3 pages); see also Clorox Test Strip App video at https://www.youtube.com/watch?v=WvTCYOUHwEA, Aug. 3, 2015.

www.Cloroxpool.com screen shots printed May 31, 2017, 3 pages.

* cited by examiner

SPA/POOL WATER TREATMENT SYSTEM AND METHOD

CROSS-REFERENCE TO RELATED APPLICATIONS

This application claims priority from U.S. Provisional Patent Application Ser. No. 62/620,190, filed Jan. 22, 2018, and is a continuation-in-part of U.S. patent application Ser. No. 15/019,236, filed Feb. 9, 2016, now issued as U.S. Pat. No. 9,990,560, which claims priority from U.S. Provisional Patent Application Ser. No. 62/113,799, filed Feb. 9, 2015. The entire contents of the above-identified applications are expressly incorporated herein by reference in their entireties, including the contents and teachings of any references contained therein.

BACKGROUND

No sensors exist for alkalinity or cyanuric acid measurements of water to be treated. Accordingly, a test strip must be used that includes indicators that change colors at specific concentrations. But users have difficulty reading the color changes on a test strip for various reasons, which results in variations and inaccuracy. For example, about 20% of users are color-blind or may be viewing the strip in improper lighting that is too bright or too dim. Moreover, relying on visual comparison to a reference chart is problematic because the reference chart may suffer from printing imperfections and can include only so many reference gradations due to size and space limitations.

Furthermore, there is a need for a line of pool/spa products with advanced analytical and control features that will enhance the effectiveness of pool/spa products and implement the pool/spa products in a variety of applications.

SUMMARY

In one form, a platform is implemented in conjunction with a mobile phone or tablet APP to analyze and act upon pool and spa test strips. In particular, a mobile phone or tablet APP analyzes the color of test strips.

Provided herein are implementation details and some preliminary test data to support the approach. In addition, design details such as software frameworks and libraries used are provided.

BRIEF DESCRIPTION OF THE DRAWINGS

Corresponding reference characters indicate corresponding parts throughout the drawings.

DETAILED DESCRIPTION

Advances in the cameras and processing power of smart phones and tablets make them a platform for running computer vision algorithms and processes to provide accurate test strip analysis which does not depend on a user comparing colors on a test strip to a reference. Algorithms in computer vision are used to detect objects and their colors (in this case a pool/spa test strip). Initial testing has indicated that a test strip can be detected and analyzed by using square detection and finding squares in close proximity to each other and in line, while minimizing false positives.

To enhance the effectiveness in one embodiment, a machine-readable code can be placed on the test strip. For example, a code readable by a mobile device can be used, such as a bar code, a data matrix code, and/or a QR code if the strip is wide enough to accommodate the minimum QR code size to get sufficient resolution for readability. Placing a code on the test strip allows the APP to simply search for a code initially, rotate the image based on the code, and then apply advanced object detection routines to determine a location and color of the test strip pads. Aspects of the test strip are further described herein and in U.S. patent application Ser. No. 29/650,177, filed Jun. 5, 2018, entitled TEST STRIP, the entire disclosure of which is expressly incorporated herein by reference.

Furthermore, adding a code to the strip provides additional benefits including but not limited to:

The code can be used to encode the strip manufacturer. This can be used for the following:
1. The code can be set up to only work with certain manufacturers.
2. The APP can use the manufacturer information encoded on the code to look up (e.g., utilize a look-up table in a cloud database) the test square layout, including a number and size of the squares, and what the different colors mean to determine test results.

The code can encode the expiration date. This can be used for the following:

1. If the code is expired, the user can be warned.
2. If the code is about to expire, the user can be asked if they would like to purchase more strips and could do so directly from the application.

The code can be printed in a well-known color (i.e. red) and this can be used for camera calibration The code can also encode other tracking information.

Figure 1:
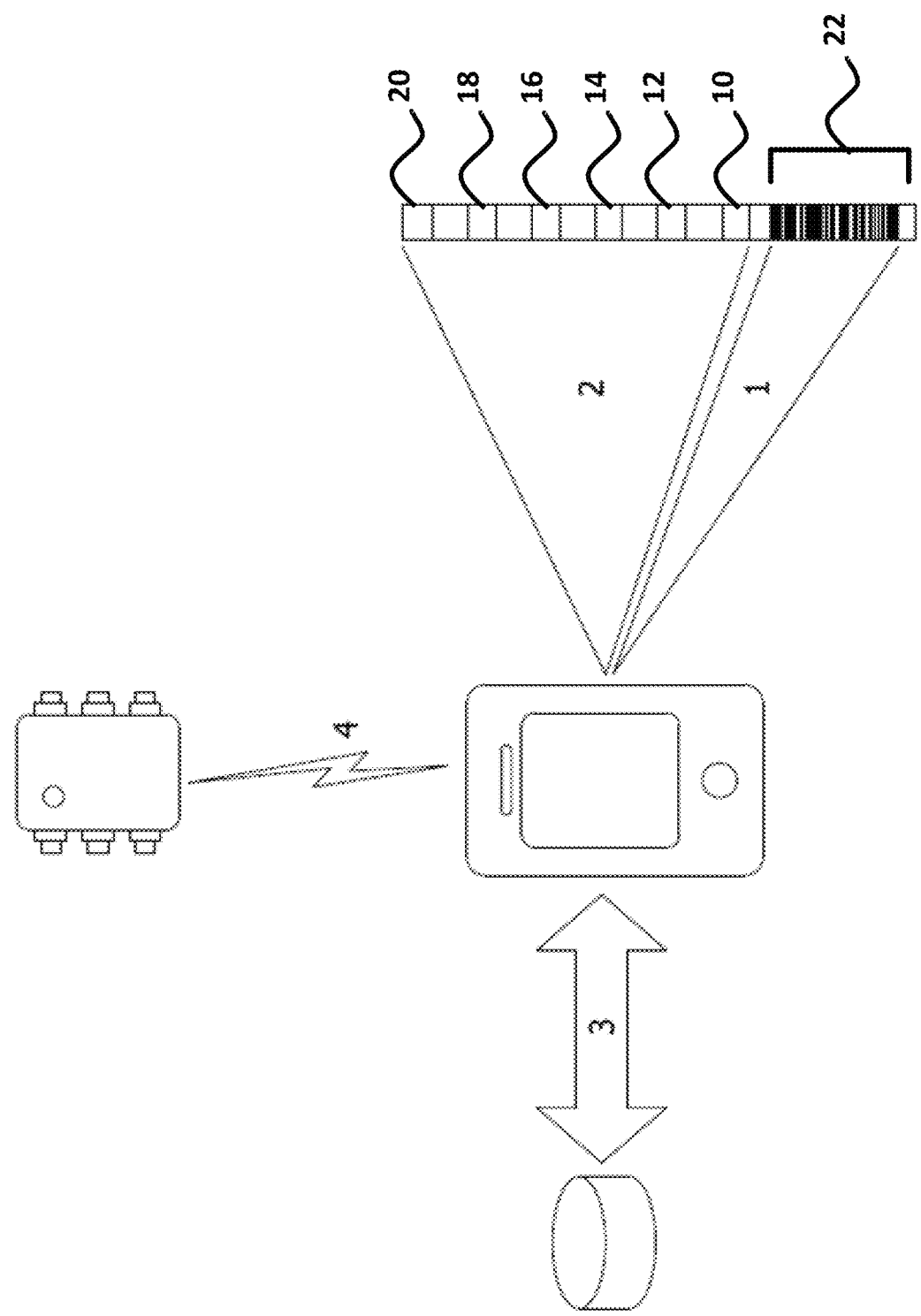
FIG. 1 is an illustration of a system overview according to one embodiment of the invention.

Based on the embodiment in which the test strip has a machine-readable code (e.g., QR code, data matrix code, etc.), one implementation provides the capability of analyzing test squares on the test strip and transmitting instructions to a user, as illustrated in FIG. 1. During implementation of aspects of the system, generally indicated at 1, the APP detects via the camera a QR code 22 to confirm that a test strip has been placed in front of the camera (in this example, a tablet or smart phone camera). In an exemplary embodiment, the APP includes processor-executable instructions, stored in a computer-readable storage medium and executed by a processor of a computing device (e.g., a tablet or a smart phone), for acquiring visual image data of the test strip via the camera. During further implementation of aspects of the system, generally indicated at 1, the APP reads the QR code 22 on the strip to determine the manufacturer and other pertinent information (described in more detail herein). In an exemplary embodiment, the APP includes processor-executable instructions that adapt the computing device for identifying bar codes in image frames captured by the camera.

The APP detects the test squares (e.g., squares 10-20 as described in more detail herein) on the strip with regard to their position relative to the detected QR code and determines their color during implementation of aspects of the system generally indicated at 2. In an exemplary embodiment, the APP includes processor-executable instructions that adapt the computing device for identifying the test squares based on the barcode location and determining a color of each test square in image frames captured by the camera.

During additional implementation of aspects of the system, generally indicated at 3, the APP looks up the meaning of the color of each test square in internal storage devices and/or external storage devices (i.e. a file or database). In an exemplary embodiment, the APP includes processor-executable instructions that adapt the computing device to transmit data regarding the color of each test square to a database via a communications network (e.g., the Internet) and receive data indicative of an indication of a pH range associated with each color. During implementation of aspects of the system, generally indicated at 4, the APP transmits the results back to a user (in one example, a pool/spa control board). In an exemplary embodiment, the APP transmits water treatment instructions, via a communications network (e.g., Bluetooth, Wi-Fi, etc.), to a control device associated with a pool or spa for treating the water of the pool or spa in accordance with the transmitted instructions. By operating in this manner, aspects of the system act (e.g., control a treatment device) upon analysis of the test strips.

Figure 2:
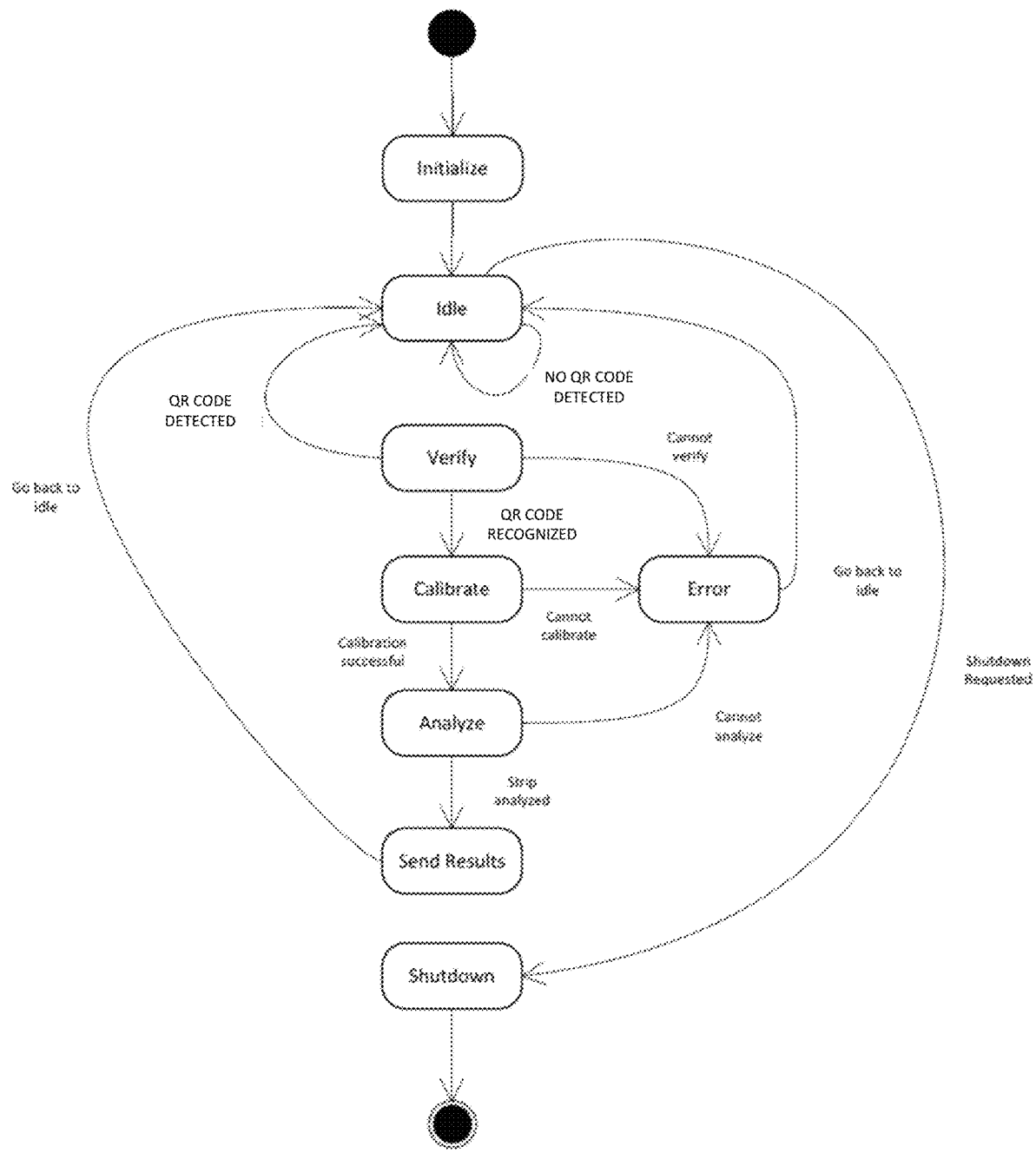
FIG. 2 is a block diagram of a high level state machine according to one embodiment of the invention.

At a high level, the APP system flow can be broken into eight unique states. The states are generally summarized as follows and are illustrated in block diagram form in FIG. 2. In one form the APP is for use with a test strip configured to indicate a chemical condition of a fluid in which the test strip has been immersed. The APP is configured to be executed by a mobile device having a processor, a memory device, and a camera configured to read the test strip. The APP comprises processor executable instructions configured to be stored in the memory device and configured to be executed by the processor. In one form, the instructions comprise instructions to:

Initialize—This is the first state the APP system enters upon start-up. In this state all software libraries will be initialized (such as the machine vision library and the QR code reader library). The APP system will also initialize any other data and attempt to connect to external data sources (such as a database) if required.

Idle—In this state the APP system continuously scans for a QR code. If a QR code is found, it will transition to the next state; otherwise, it will keep scanning.

Verify—In this state the QR code which has been found is checked to make sure it is a recognized one. If the QR code is recognized the APP system will continue. If it is not recognized the APP system will transition back to idle.

Calibrate—In general, the camera can be optionally calibrated. In one form, the QR code is printed in a known color to aid in calibration. Based on this color the camera can be calibrated for this particular read of the test strip.

Analyze—Based on the QR code location and manufacturer information, the test squares will be located and their color will be analyzed. The meaning of the colors will either be stored in the APP itself or in an external data source (such as a cloud database). In one form, the instructions to analyze comprise:
  instructions configured to locate one or more pads on the test strip;
  instructions configured to determine a color of each located pad;
  instructions configured to compare the determined color to a reference; and
  instructions configured to determine the chemical condition indicated by each pad based on the comparison.

Send Results—Once the strip has been analyzed, the results will be sent to the interested user (e.g., an operator or a pool/spa controller) for further action.

Error—This state is entered any time another state cannot properly complete. Clean up will occur in this state and then the APP system will transition back to Idle.

Shutdown—This state is entered any time after the idle state in response to a manual command, a time-out, or a specific, pre-defined condition.

Figure 3:
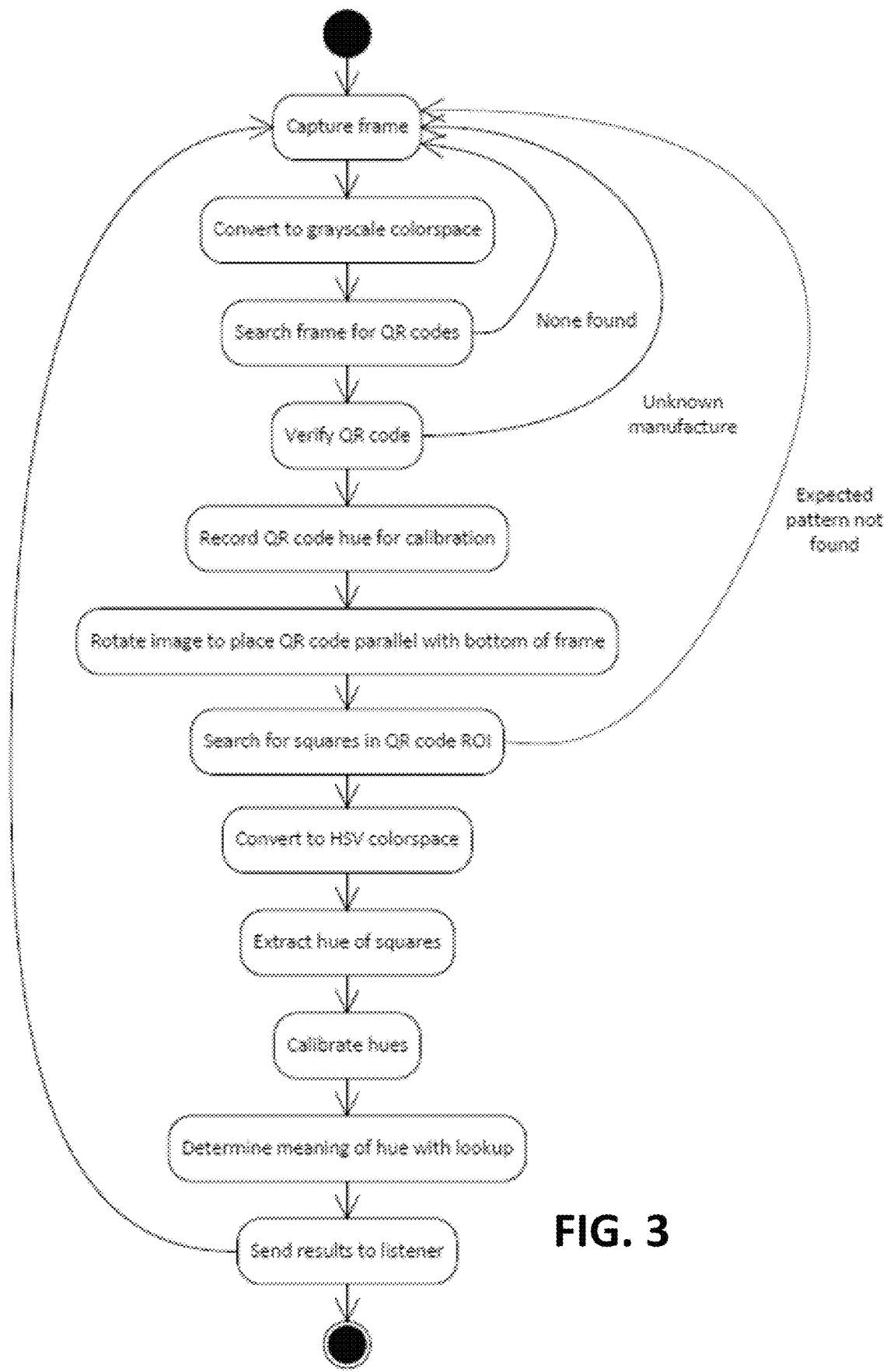
FIG. 3 is a block diagram of a frame analysis pipeline according to one embodiment of the invention.

A detailed state machine describing the analysis instructions that are executed by the processor of the mobile device when each frame is captured and analyzed is illustrated in block diagram form in FIG. 3. In one form, the frame processing state machine works as follows based on processor executable instructions for the following.

1) A frame is captured from the onboard camera and fed into the image processing pipeline.
2) The frame is converted to grayscale.
3) The frame is fed into the code detection algorithm to search for QR codes. If no QR code is found, the pipeline is exited and a new frame is captured.
4) If a QR code is found, the QR code is verified against predefined criteria such as:
   Correct form or format
   Acceptable manufacturer
   The calibration strip is not expired
   Other pre-defined criteria
5) The hue of the QR code is recorded for calibration purposes. Based on the known hue of the QR code and the recorded hue from the camera, the camera can be calibrated.
6) The image is rotated based on the QR code position, the beginning of the QR code, and its size to place the QR code parallel with the bottom of the frame with the start position of the code on the left.

7) The region of the image next to the QR code is run through a Haar classifier to guarantee that test strip pattern of test squares if found. Currently, this is just an added, optional check to confirm that the machine vision is working correctly; this check can be removed. If the Haar classifier does not find the features it is searching for (in this case multiple test squares in a row) the pipeline is exited and a new frame is captured.

8) Search the ROI (region of interest) found by the Haar classifier for the individual test squares and note the locations. Further details regarding square detection are provided herein.

9) Convert the ROI to HSV (Hue, Saturation Value) colorspace. HSV colorspace is preferable to RGB (red, green, blue) for color detection as it will minimize the effects of the lighting (sunlight, poor lighting, flash).

10) Extract the hue of each test square.

11) Determine the meaning of the square hue via an internal lookup or and external data source (database or file).

12) Send the results to the user (e.g., via Bluetooth or Wifi).

Optional APP Implementations

In one embodiment, the test strip APP 116 can be configured to store test strip data readings (e.g., pad/square color) or other data input by a user in a data store 120, such as in memory device 110, or to store the data at a remote location such as a remote data store 122 on a site by site basis (cloud or otherwise). In addition, the APP 116 could include a report writer 124 to selectively access the stored data to generate a report from stored data. The data and/or reports could be provided to users, such as a pool service company, pool owners, and other customers. For example, the data and reports could be maintained at hotels to show conformance with health department regulations or other requirements.

It is also contemplated that the APP 116 be configured with instructions so that it could also be used as a chemical calculator driven by the readings of the test strip 102. For example, a data field could be added to the APP 116 allowing a user to input the size of a body of water to be treated and a zip code of the location. Based on the readings from the test strip 102, a lookup table could be used to provide treatment information regarding the amount of chemicals needed to get the water within health department ranges based on the zip code of the pool.

Also, another alternative option is encoding a date of manufacture or an expiration date of a test strip 102 within the QR code on the strip. The APP 116 could read the QR code and recognize the date on the test strip and, in response, could notify a user regarding the date and suggesting buying more strips as the expiration date of the strip get close. Further, the APP 116 can be configured to communicate with a seller so that a user could have a one touch buying experience (e.g., the APP 116 could be linked to an Amazon® account).

In yet another alternative embodiment, the APP 116 is configured to provide chemical dosages. In accordance with this embodiment, the APP 116 is configured to store properties associated with a pool/spa in a data store 120, such as in memory device 110 and/or remote data store 122. For example, the APP 116 may receive user input regarding properties associated with a pool such as length, width, water depth, volume, inventory of treatment chemicals (FIG. 19), and the like. The APP 116 may develop and store an inventory of chemicals by utilizing captured images of barcodes (e.g., UPC barcode) associated with the chemicals. Developing an inventory of chemicals by capturing images of the barcodes associated with those chemicals allows the APP 116 to determine properties of the chemicals that may not be available through manual user input. For example, scanning a UPC barcode associated with a certain commercial embodiment of a chemical allows the APP 116 to determine a strength (e.g., percent calcium chloride) of the chemical. Utilizing a known volume of the pool (e.g., 500 gallons) and a property of the water in the pool (e.g., pH of 6.8), the APP 116 can access the stored chemical inventory to determine an amount of inventoried chemical to add to the water of the pool (e.g., one scoop of chlorine). In an embodiment, the chemical inventory is a look-up table stored in data store 120, such as in memory device 110 and/or remote data store 122 (e.g., a cloud database). In yet another embodiment, the APP 116 is configured to communicate with a seller to purchase a needed chemical that is not in the inventory, as further described herein.

Aspects of the APP 116 may provide an exemplary benefit to pool/spa service companies because untrained staff and/or customers can utilize the APP 116 to provide details of the pool/spa before a trained technician is dispatched.

Implementation Details

This section documents one embodiment of implementing the processes provided in the previous sections.

One embodiment is based on the following high level requirements:

1) The APP shall be configured as a cross-platform and run on the following platforms at a minimum:
   iOS
   Android
2) The APP detects the test strip without user intervention.
3) The APP shall be configured to work in multiple lighting conditions and inform the user if the current lighting conditions are unacceptable.
4) The APP shall be configured to transmit findings back to a pool/spa controller wirelessly (e.g., via Bluetooth or Wifi).

In order to satisfy the above requirements, the following software components can be employed in one embodiment.

QT Framework—The Application can be written in the QT framework so that it can be cross-compiled for all major OS distributions (including Windows, Linux, and OS X) as well as all major smart phone distributions (Android, iOS, Blackberry, and Windows Phone). More information is available at http://qt-project.org/.

OpenCV—The OpenCV computer vision framework will be used for all vision algorithms except for code detection. The OpenCV framework is cross-platform and is precompiled to run on Android, iOS, Windows, OS X, and Linux. (For example, see http://opencv.org/).

ZBar—ZBar is a cross-platform code reader. It can be used to find codes in frames captured by the device's camera and is precompiled for many platforms. (For example, see http://zbar.sourceforge.net/).

In order to confirm implementation, sample code was written to test the detection strategies. Illustrated photos of the test strip from the test Application (running in Windows and built on the QT Framework) are presented in FIGS. 4-9.

Figure 4:
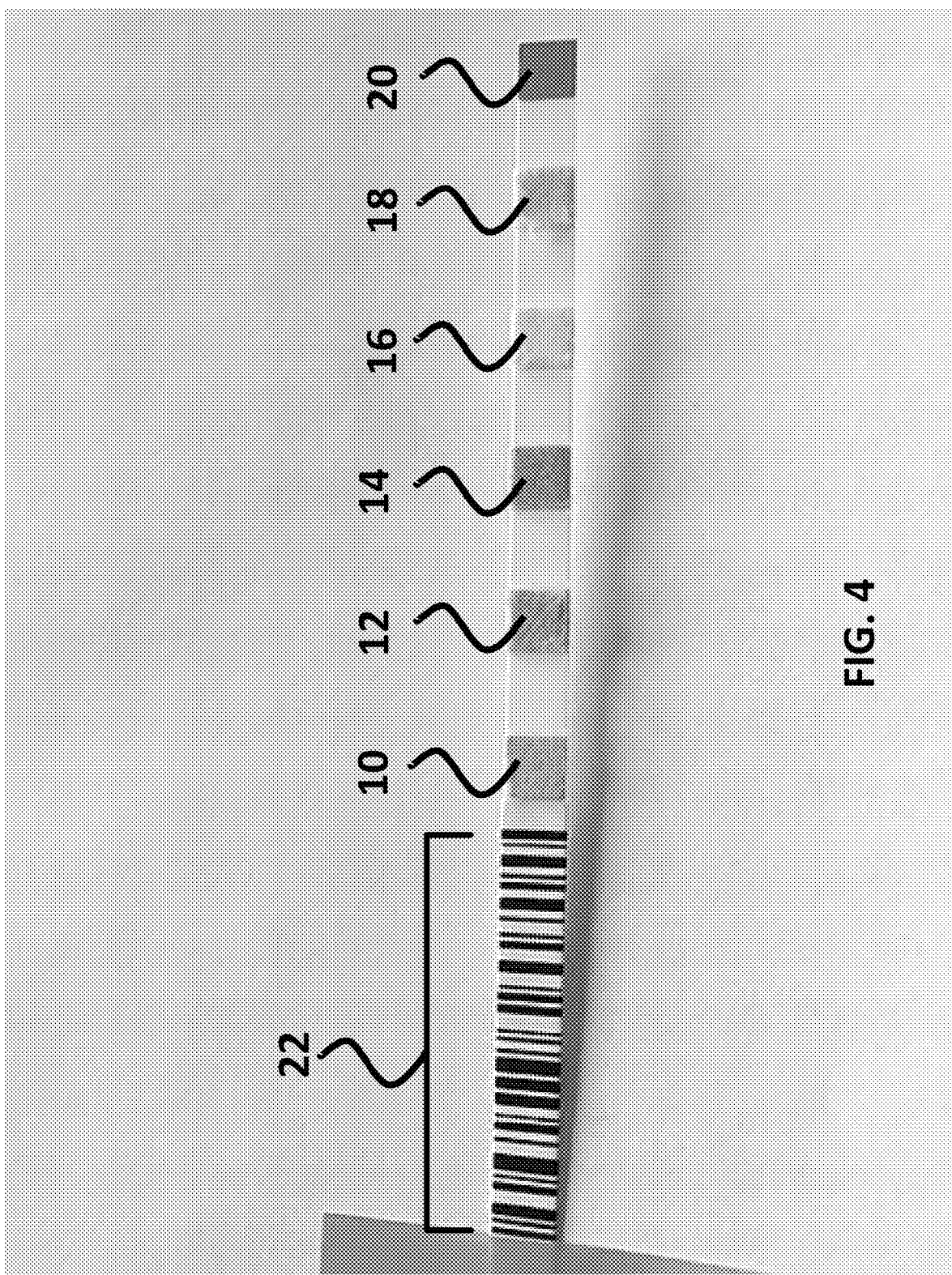
FIG. 4 is a photo of a test strip setup.

FIG. 4 illustrates the test strip setup. Illustrated is an off the shelf AquaChek 6-Way test strip to which a bar code has been added with "123456789" encoded in the bar code for testing. The test strip is taped to a white background to make the strip and its components easier to determine and distinguish, but the tests would work the same against most other backgrounds. In most cases, detecting objects against a white background is one of the hardest test cases.

The test strip in the embodiment illustrated by FIG. 4 includes squares 10, 12, 14, 16, 18, and 20 including chemical reagents associated with pH and a code 22 (e.g., bar code, QR code, etc.). In the illustrated embodiment, square 10 exhibits a substantially lemon-yellow color, square 12 exhibits a substantially pale-yellow color, square 14 exhibits a substantially orange-yellow color, square 16 exhibits a substantially white-yellow color, square 18 exhibits a substantially yellow color, and square 20 exhibits a substantially purple color. One having ordinary skill in the art will understand that the squares may exhibit other universal indicator colors and combinations and/or mixtures thereof, including red, orange/yellow, green, blue, and violet/purple.

Figure 5:
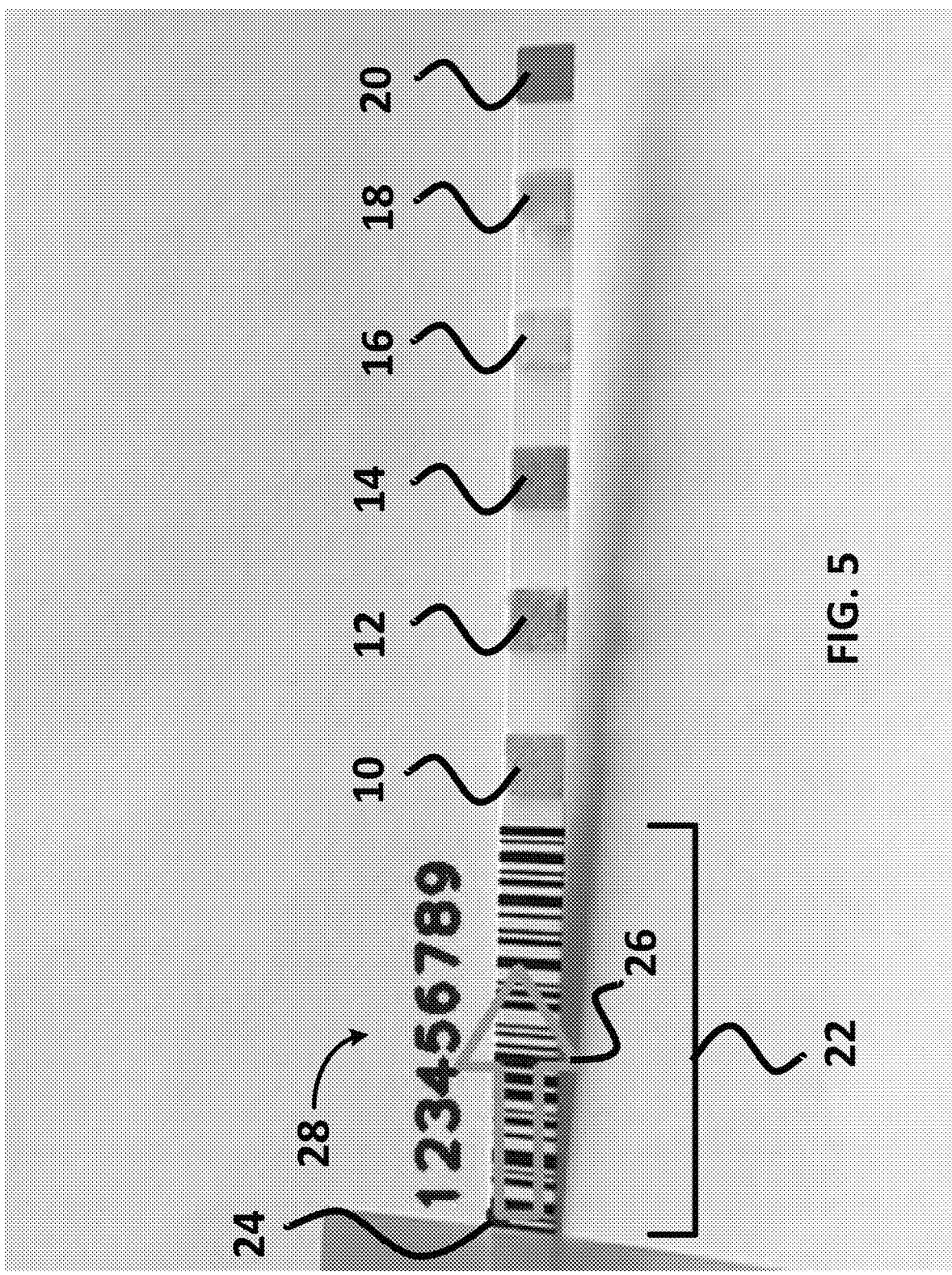
FIG. 5 is a photo of a test strip setup indicating bar code detection.

FIG. 5 illustrates that the software has detected the bar code 22. The start of the bar code is illustrated with a red dot 24 and an arrow 26 was superimposed by OpenCV to show the order in which the bar code was read. The red text 28 illustrates what the ZBar library read from the bar code which is correct.

Figure 6:
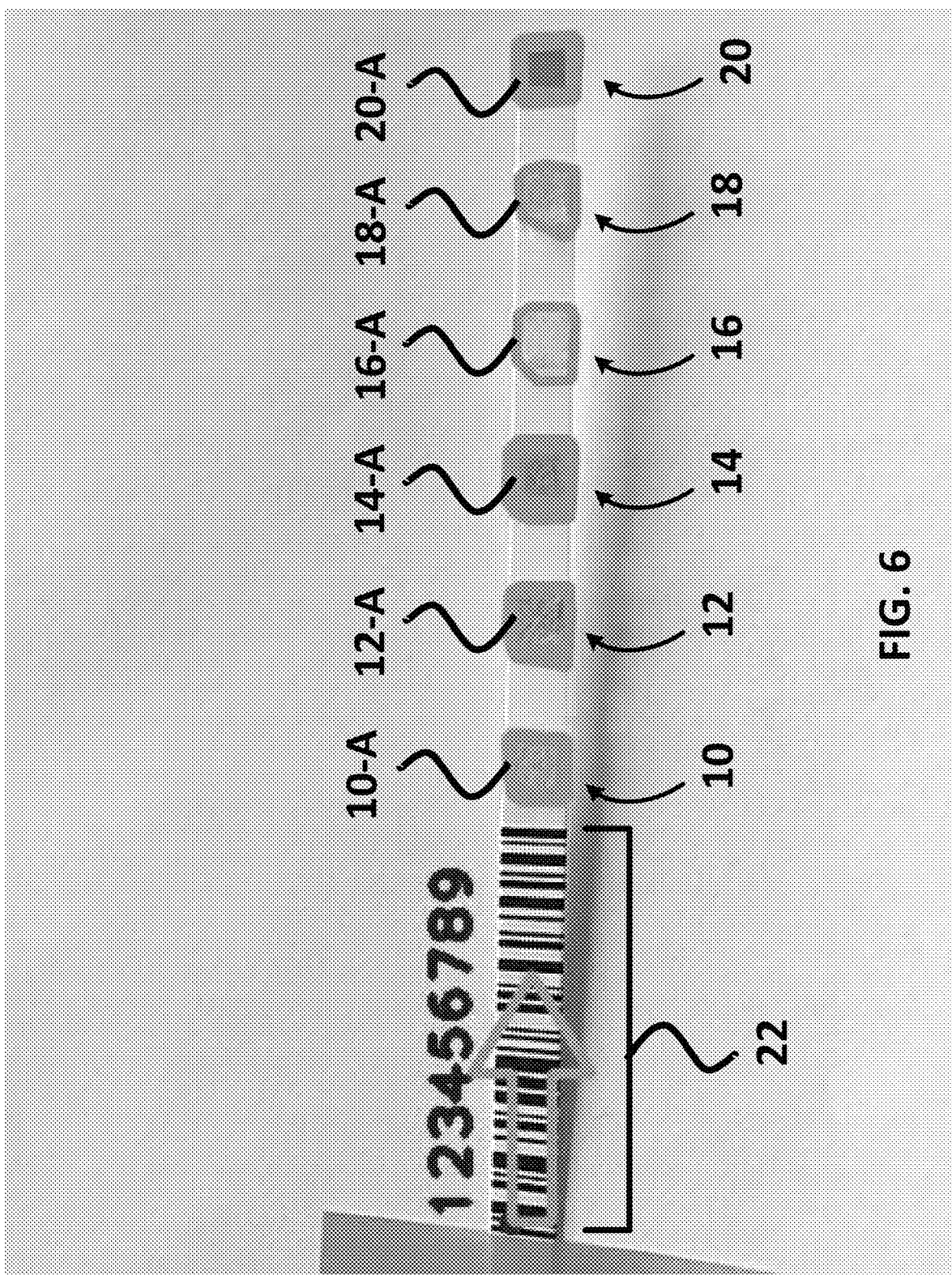
FIG. 6 is a photo of a test strip setup indicating square detection.

As illustrated in FIG. 6, after the bar code is detected, the squares are each detected in a confined region of interest based on and relative to the bar code location. Each region of interest is demarcated via a green line 10-A, 12-A, 14-A, 16-A, 18-A, 20-A around the perimeter of each region in the embodiment illustrated by FIG. 6.

Figure 7:
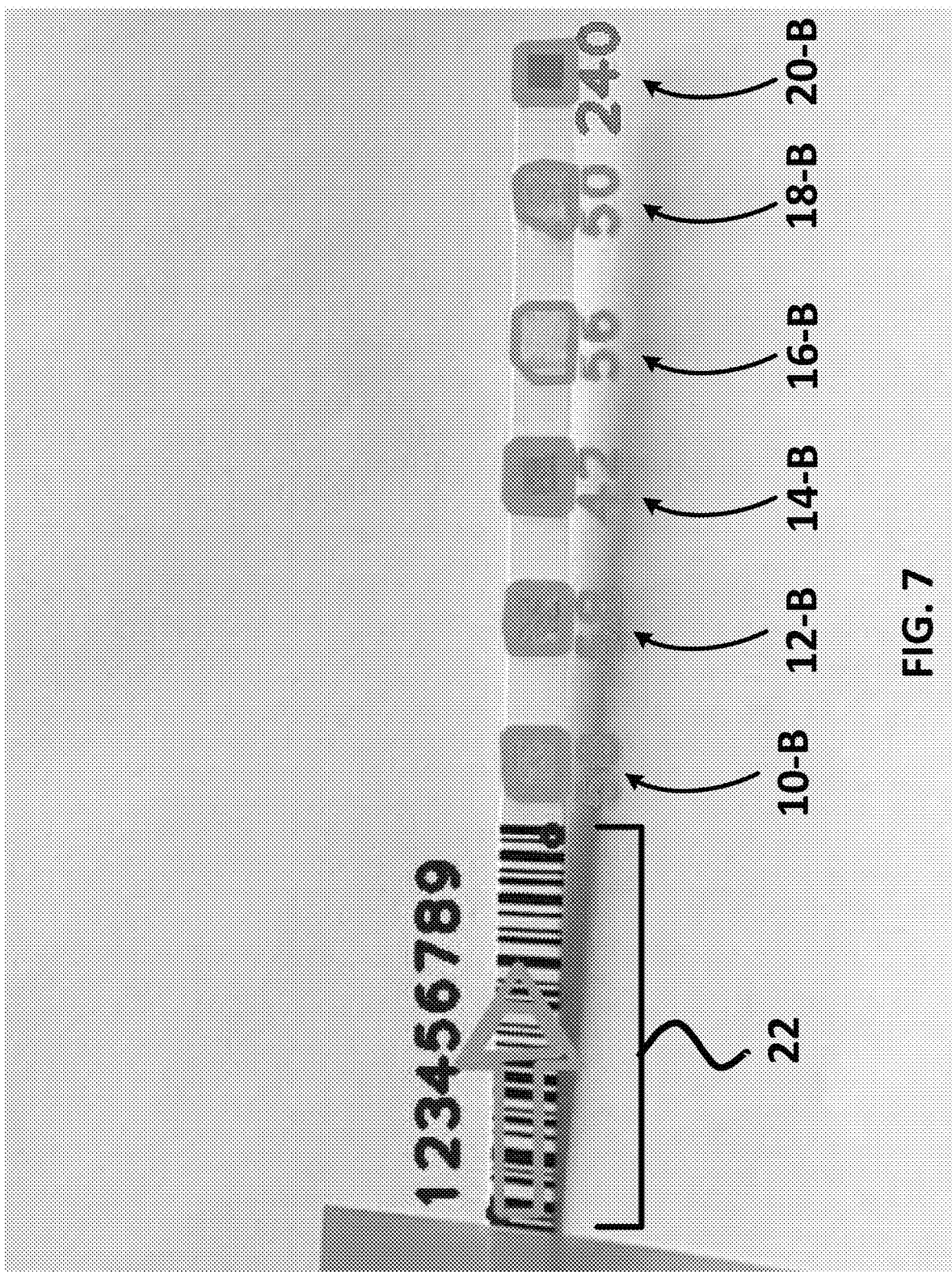
FIG. 7 is a photo of a test strip setup indicating hues detection.

Once the squares are detected the hues of each square are determined by averaging the hues of points in each square, as illustrated in FIG. 7. The text indicators 10-B, 12-B, 14-B, 16-B, 18-B, 20-B in FIG. 7 are each a numerical representation of the hues of each square 10, 12, 14, 16, 18, 20, respectively.

Figure 8:
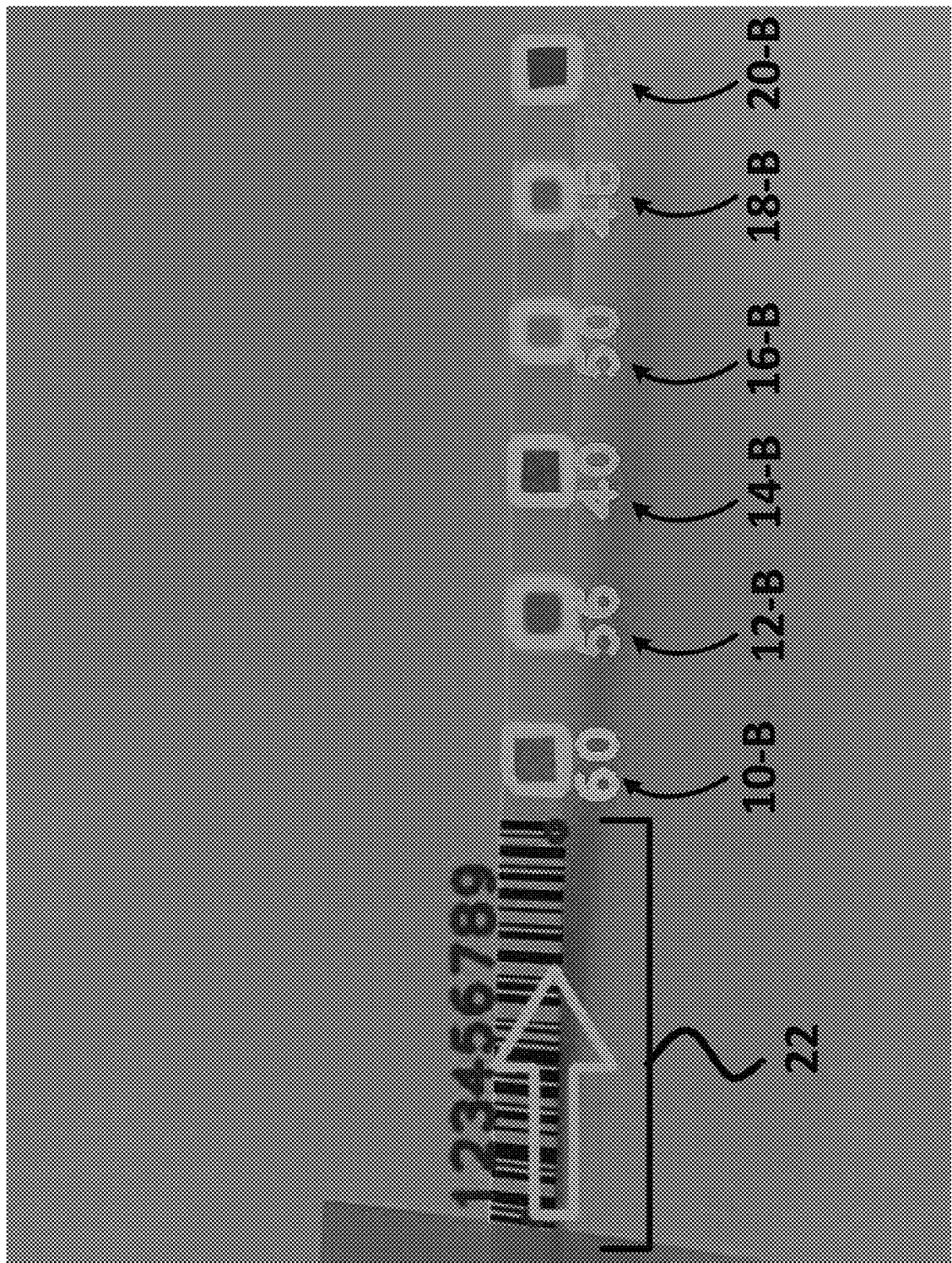
FIG. 8 is a photo of a test strip setup indicating low light condition detection.

To confirm low light operation, the same detection was run under low lighting conditions and the hue values stayed roughly the same as illustrated in FIG. 8.

Figure 9:
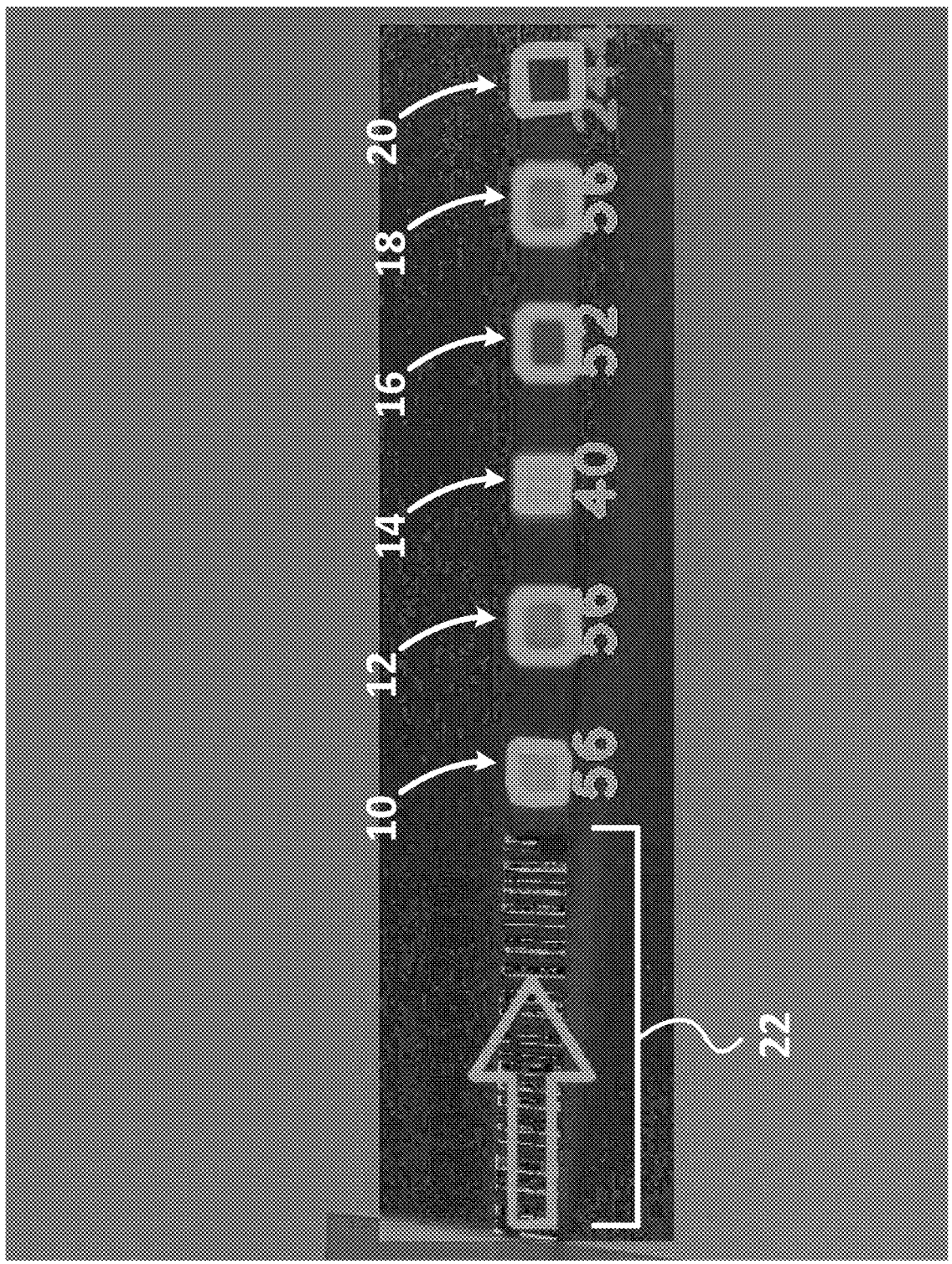
FIG. 9 is a photo of a test strip setup indicating HSV color space detection.

FIG. 9 illustrates the HSV color space which is what the machine vision library is actually using to detect the hues.

Initial investigation confirms the outlined process and implementation. All current data was collected on a Windows computer, but versions of the Application have also been run and effectively work on an iOS device.

The test strips of the invention can measure any one or more of the following: total hardness, high range hardness, low range hardness, total chlorine, bromine, free chlorine, pH, total alkalinity, cyanuric acid, temperature, color, total dissolved solids (TDS), salt, conductivity, copper, nitrites, phosphates, high-range chlorine, borates, iron, sodium bromide, and/or white salt titrators, and/or any other chemical or ion which can be measured by color testing.

Figure 10:
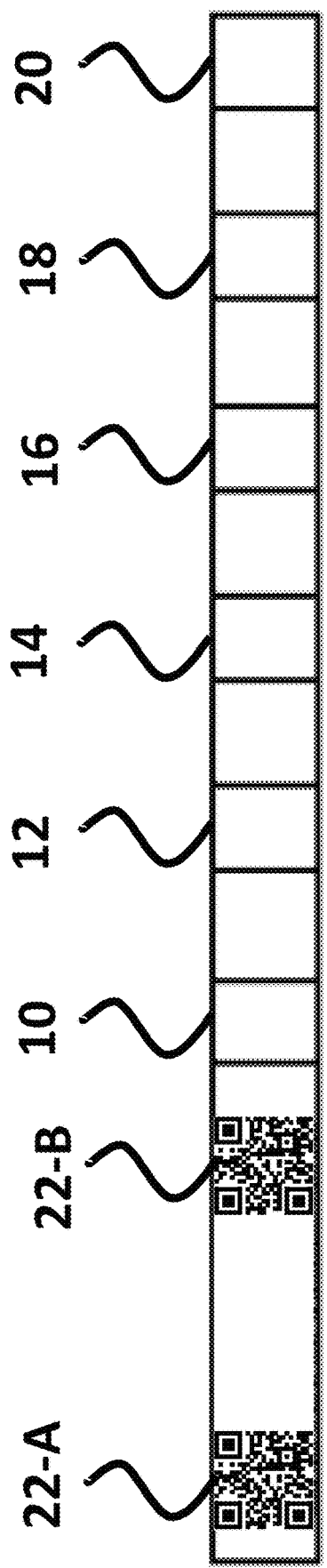
FIGS. 10 and 11 are diagrams of a test strip setup with multiple QR codes according to one embodiment of the invention.

FIG. 10 illustrates an embodiment of the test strip having multiple QR codes. In addition to the squares 10-20, this embodiment of the test strip includes a first QR code 22-A and a second QR code 22-B located on a handle of the test strip. In accordance with an aspect of the invention, QR code 22-A and/or QR code 22-B encode all of the strip metadata (e.g., strip manufacturer, expiration date, tracking information, etc.) at a lower resolution than an embodiment utilizing a single QR code. Beneficially, utilizing multiple QR codes allows each QR code 22-A, 22-B to be printed at a small size (e.g., to fit on a handle of the test strip) without a loss of quality. In another embodiment, the multiple QR codes 22-A, 22-B allow the APP to more accurately determine orientation of the test strip in a captured image and the location of the squares relative to the codes 22-A, 22-B, as further described herein. In accordance with a further aspect of the invention, an accurate determination of the strip orientation utilizing multiple QR codes 22-A, 22-B allows the APP to utilize fewer computing resources by foregoing computationally expensive computer vision routines.

Figure 11:
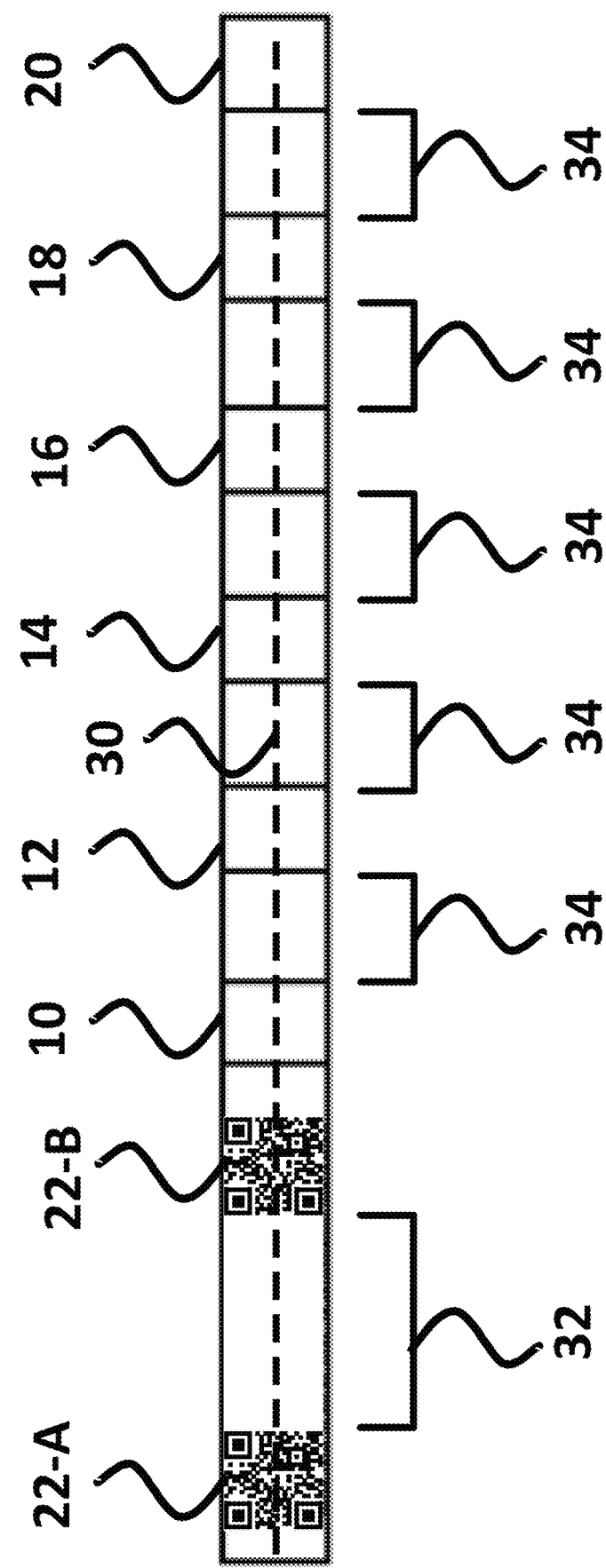

FIG. 11 illustrates aspects of a multiple QR code test strip utilized by a positioning algorithm implemented by the APP 116. In an embodiment, the QR codes 22-A and 22-B serve as two points on a line 30 along which squares 10-20 are located. In accordance with an aspect of the invention, utilizing the multiple QR codes 22-A, 22-B allows the APP 116 to more accurately determine the orientation of the test strip. For example, if a single QR code is utilized and the code is skewed relative to the test strip, the ability of the APP to detect squares 10-20 is hindered. In an embodiment, the APP 116 locates a substantially center point of each QR code 22-A, 22-B to define line 30. In another embodiment, the APP 116 utilizes a code interval 32 between the QR codes 22-A, 22-B to determine square intervals 34 between squares 10-20. In an embodiment, the code interval 32 is a substantially same distance as square intervals 34. In another embodiment, the code interval 32 is about half the distance as square intervals 34 (e.g., half-spacing). In accordance with an aspect of the invention, the APP 116 searches for squares 10-20 along line 30 beginning at QR code 22-B at distances substantially equal to the square interval 34 as a function of the code interval 32.

Figure 12:
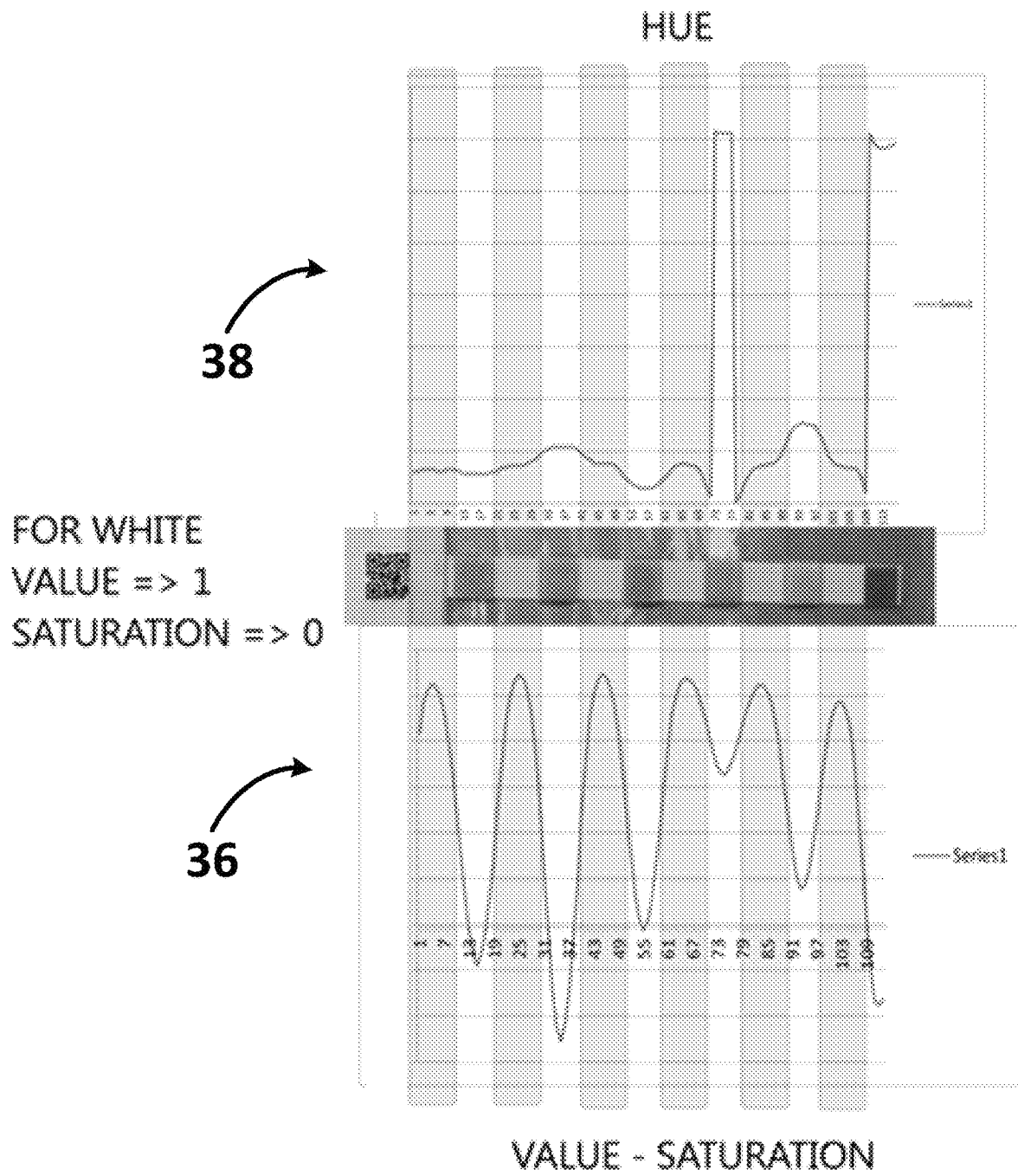
FIG. 12 is a graphical plot of a peak detection algorithm according to one embodiment of the invention.

In an embodiment, the APP 116 utilizes a detection algorithm over the length of the test strip to determine the position of squares 10-20. In one form, a white value peak detection algorithm determines the location of the white spaces between the squares 10-20 such that the hue value for each square can be sampled at positions between the white spaces. Alternatively, a trough detection algorithm can be used to determine the minimal white space which is indicative of the location of the squares 10-20. For example, the APP 116 samples and collects the result of subtracting the Saturation from the Value of the HSV colorspace at regular intervals across the strip. FIG. 12 illustrates a plot of the result of such subtraction at profile 36 and the corresponding Hues at profile 38 which are sampled at the troughs of profile 36. The illustrated embodiment is for a white Value of greater than or equal to one and a Saturation value greater than or equal to zero. The plot of the result of the subtraction at profile 36 is analyzed by the APP 116 to find the peaks, which represent the center of the interval between squares 10-20, and the troughs, which represent the center of each square 10-20.

Figure 13:
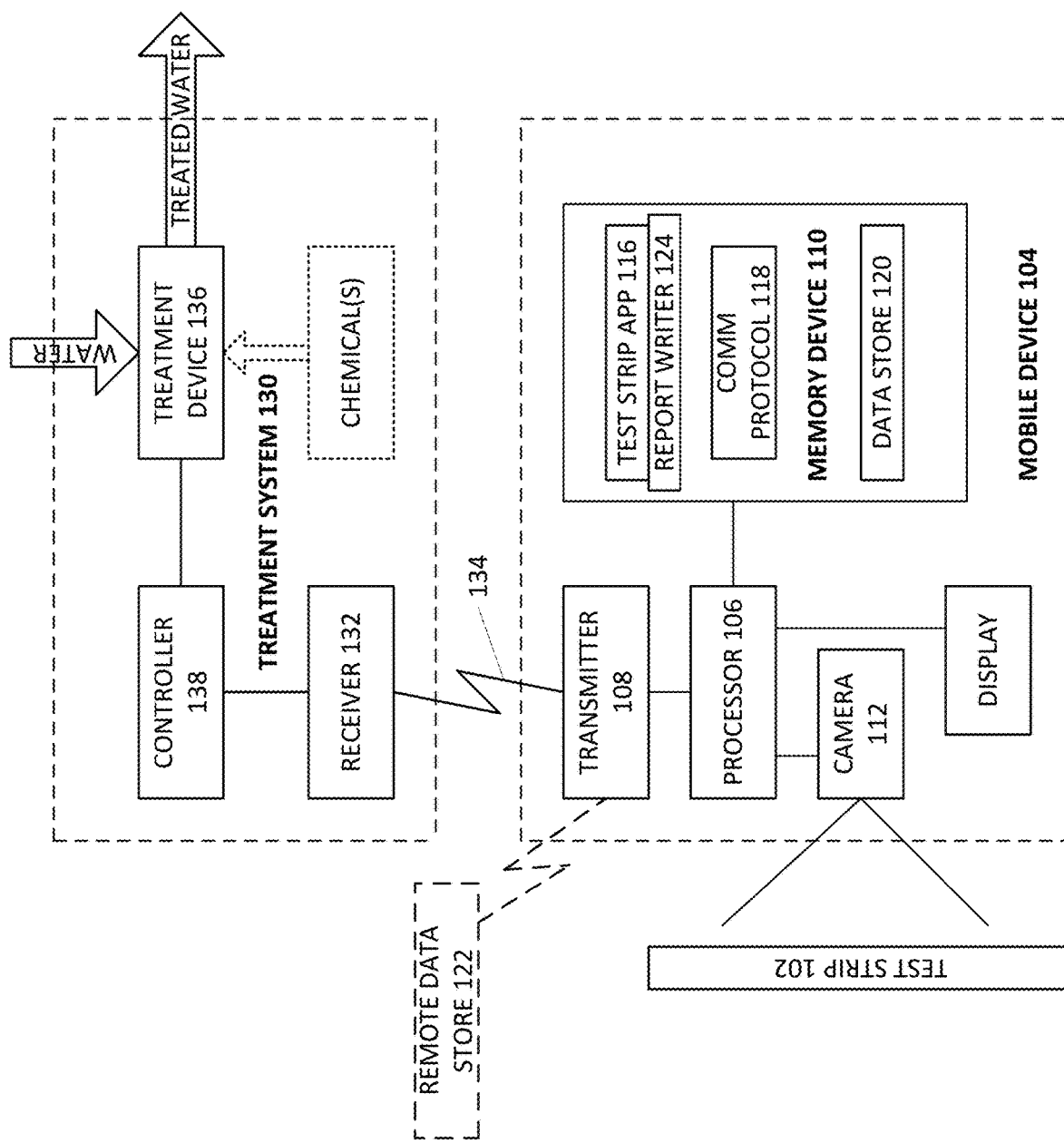
FIG. 13 is a block diagram of one embodiment of a system according to the invention.

FIG. 13 is a block diagram of one embodiment of a system according to the invention. FIG. 13 illustrates a system 100 for treating a fluid (e.g., pool/spa water) and for use with a test strip 102 configured to indicate a chemical condition (e.g., chlorine level) of the fluid. In an embodiment, test strip 102 comprises squares 10-20 and/or code 22 (e.g., barcode, QR code, etc.). A mobile device 104 having a processor 106, a transmitter 108, a memory device 110, a camera 112, and a display 114 is configured to read the test strip 102. A test strip APP 116 comprising processor executable instructions configured to be stored in the memory device 110 is configured to be executed by the processor 106. As noted herein, the App 116 includes the following instructions:

instructions configured to locate one or more pads on the test strip 102;

instructions configured to determine a color of each located pad;

instructions configured to compare the determined color to a reference;

instructions configured to determine the chemical condition indicated by each pad based on the comparison; and instructions configured to communicate via the transmitter 108 using a communications protocol 118 the determined chemical condition to a user or a treatment device via the transmitter.

In one form, the mobile device 104 communicates with a treatment system 130 for treating a fluid such as water. A receiver 132 is configured to communicate with the transmitter 108 and configured to receive a signal 134 from the transmitter 108 indicative of the determined chemical condition of the fluid. A treatment device 136 treats the fluid; for example, the treatment device 136 comprises a mixing device such as a mixing valve for adding one or more fluids/chemicals to the fluid for altering the chemical condition of the fluid. Alternatively or in addition, the treatment device 136 comprises a fluid altering device such as an ionization chamber, a heating/cooling device, a sterilizer, and/or a filter. In one embodiment of a system for treating pool/spa, the mixing device comprises a device for adding chlorine for low chlorine levels or adding a chlorine neutralizing chemical such as sodium thiosulfate or hydrogen peroxide for high chlorine levels. A controller 138 is connected to the treatment device 136 and connected to and responsive to the receiver 132. The treatment device 136 is responsive to the controller 138. The controller 138 is configured to determine a treatment to the fluid as a function of the received signal 134 received by the receiver 132, which signal 134 is indicative of the condition of the fluid being treated. The controller 138 controls the treatment device 136 to treat the fluid in accordance with the determined treatment.

As a specific example, consider a granular chlorine feeder system for treating pool/spa water. A user tests the water with one or more test strips 102 to determine such water parameters as free chlorine, pH, and cyanuric acid of the water. The camera 112 of the mobile device evaluates the test strip(s) 102 and the APP 116 determines the chlorine level in the water based on the measured free chlorine, pH, and cyanuric acid as indicated by the test strip(s). Alternatively or in addition, the water temperature can also be determined by the user and manually input to the APP 116 as a parameter to assist in determining the chlorine level. The determined chlorine level is transmitted by the mobile device to the granular chlorine feeder system which adds chlorine to the water in the event that the determined chlorine level is below a preset minimum. This provides an accurate system and method for managing chlorine in the water because the minimum safe chlorine level depends upon the pH, cyanuric acid, and/or temperature of the water.

In an embodiment, aspects of the invention associate colors present in a captured image with colors indicative of a chemical condition (e.g., chlorine level) of a solution to alter aspects of a treatment device for altering the chemical condition. In a further embodiment, a chemical condition of a fluid indicated by test strip 102 causes the APP 116 to display the chemical condition via a graphical user interface of the display of mobile device 104. In yet another embodiment, a chemical condition of a fluid indicated by test strip 102 causes the APP 116 to communicate with the treatment system 130 via a communication network when the chemical condition indicates that an action needs to be implemented by the treatment system 130.

Peristaltic Pump Embodiment

The Bluetooth Peristaltic Pump Controller interfaces to an Android or Apple hosted application through a BLE (Bluetooth Low Energy) interface to dispense controlled amounts of chemicals for the purpose of maintaining water quality in recreational pool and spa applications. The application measures the current water quality through optical analysis of chemical test strips, calculates the required chemical dosages to bring the water quality back into a desired range, and communicates this dosing information to the controller which dispenses measured amounts of the required chemicals (such as sanitizers and pH balancing agents), restoring the water quality. The BLE interface supports two way communications allowing the application to monitor chemical storage levels (FIG. 19), dosing status (FIG. 18), dosing progress (FIG. 18) and the current status of the controller to the user. The user interface on the front panel of the controller includes a LED to indicate pump status, buttons for Bluetooth pairing, pump priming, and chemical bottle fill reset. The illustrated controller embodiment is designed to dispense one or more (e.g., up to 5) liquid chemicals by means of internal peristaltic pumps or to activate external peristaltic pumps (e.g., in larger pool applications, etc.). Several controller models will be offered based on the same core design and choice of dispensed liquid chemicals to ensure both flexibility and scalability to control water quality in various pool and spa applications.

Figure 14:
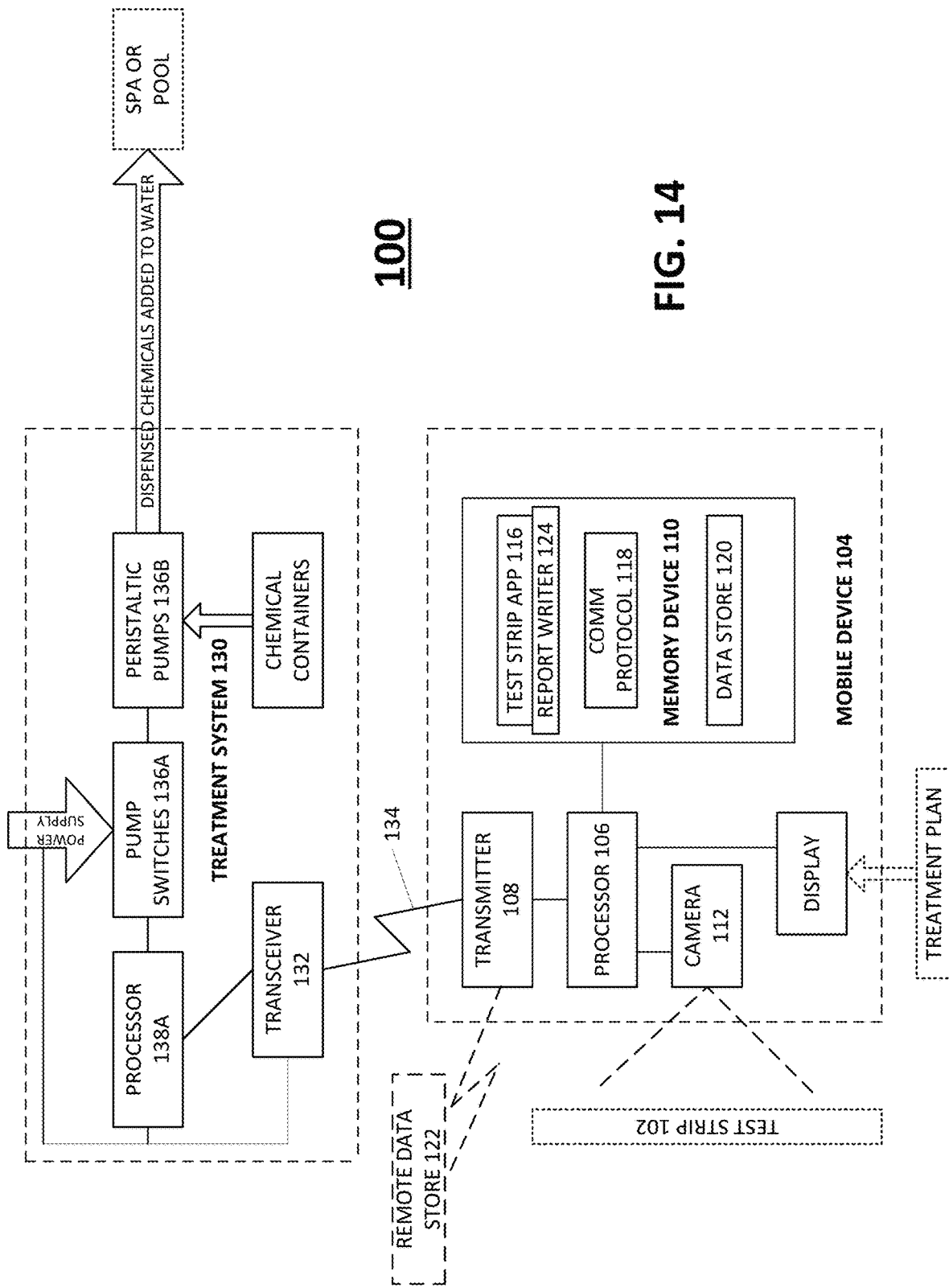
FIG. 14 is a block diagram of another embodiment of a system according to the invention.
Figure 15:
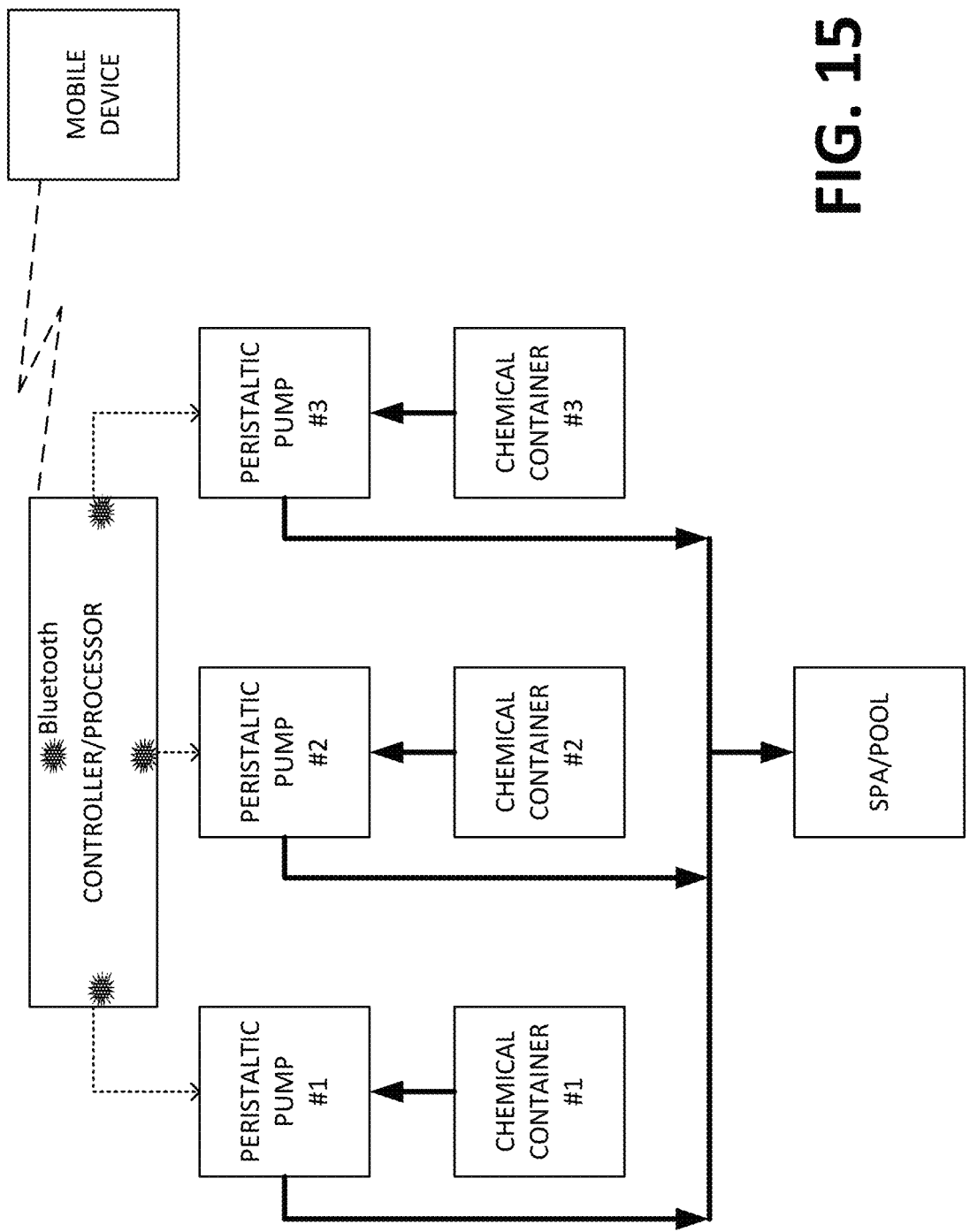
FIG. 15 is a photo of another embodiment of a system according to the invention.
Figure 17:
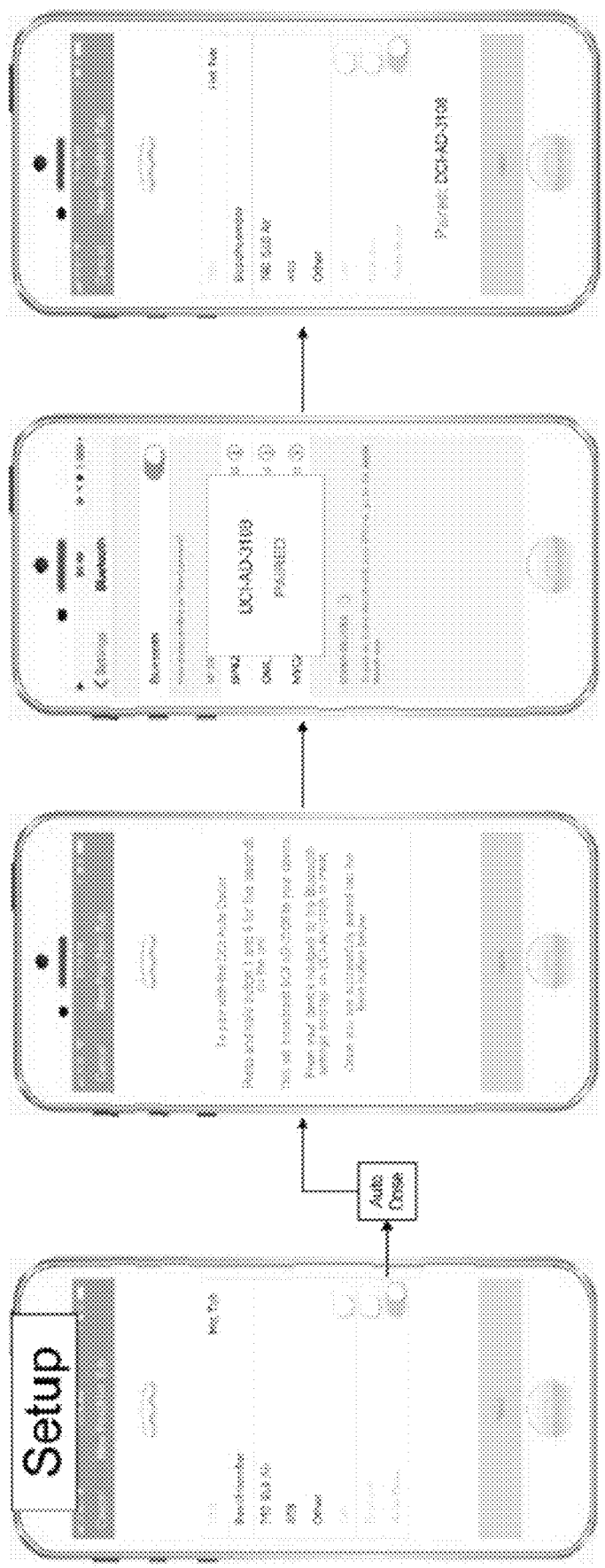
FIG. 17 is screen shots of one embodiment of the setup of the APP.

The communication between the application and the controller includes the following information:

Controller Status information
   Button status
   Output On
   Output Cancel
   Bluetooth pairing (FIG. 17)
   Priming or Dosing (FIG. 18)
   Bottle low indication
Assigned chemicals for each pump:
Required chemical dosage amounts for each chemical (FIG. 18)
Dosing status (FIG. 18)
Dosing progress percentage (FIG. 18)
Estimated chemical storage levels (FIG. 19)
Chemical storage bottle level reset Some features of the exemplary FIGS. 14-15 embodiments can include:

The pump, containers, and tubing are off the shelf components.

The treatment system in one form comprises an interface between the APP 116 and the pumps 136B, including a Bluetooth transceiver 132, processor 138A and pump switches 136A to turn pumps on and off [The pump switches can be optional if the peristaltic pumps 136B can be directly, selectively energized by a direct connection between the processor 138A and the pumps 136B, in which case the power supply would be applied to the pumps. As illustrated, the power supply supplies power to both the processor 138A and the transceiver 132. Other embodiments are contemplated such as the processor 138A supplying power to the transceiver 132 and/or the processor 138A including an internal transceiver.

The APP 116 is provided with information including the water volume and chemical types including concentrations.

In one form, the APP transmits the amount of chemical to be dispensed based on the reading of the test strip 102 and/or based on a treatment plan input by a user via the display.

The processor 138A determines the amount of time a pump needs to be energized based on info from APP.

Alternatively, the APP can determine the pump run time and provide it to the processor.

In one form, the tubing in the pump is replaced with tubing which is compatible with the chemicals being pumped so that the tubing does not deteriorate.

The number of Pumps depends on how many chemicals a user wants to use to control water quality.

The vials pictured on front of system are for demonstration to illustrate that the APP controls the volume of chemicals being dispensed.

Bluetooth Peristaltic Pump Controller

The Bluetooth Peristaltic Pump Controller interfaces to an Android or Apple hosted application through a BLE (Bluetooth Low Energy) interface to dispense controlled amounts of chemicals for the purpose of maintaining water quality in recreational pool and spa applications, for example. The application measures the current water quality through optical analysis of chemical test strips, calculates the required chemical dosages to bring the water quality back into a desired range, and communicates this dosing information to the controller which dispenses measured amounts of the required chemicals (such as sanitizers and pH balancing agents), restoring the water quality. The BLE interface supports two way communications allowing the application to monitor chemical storage levels (FIG. 19), dosing status (FIG. 18), dosing progress (FIG. 18) and the current status of the controller to the user. The user interface on the front panel of the controller includes a LED to indicate pump status, buttons for Bluetooth pairing, pump priming and chemical bottle fill reset. The controller is designed to dispense up to 5 liquid chemicals by means of internal peristaltic pumps or to activate external peristaltic pumps in larger pool applications. Several controller models will be offered based on the same core design and choice of dispensed liquid chemicals to ensure both flexibility and scalability to control water quality in various pool and spa applications.

Figure 18:
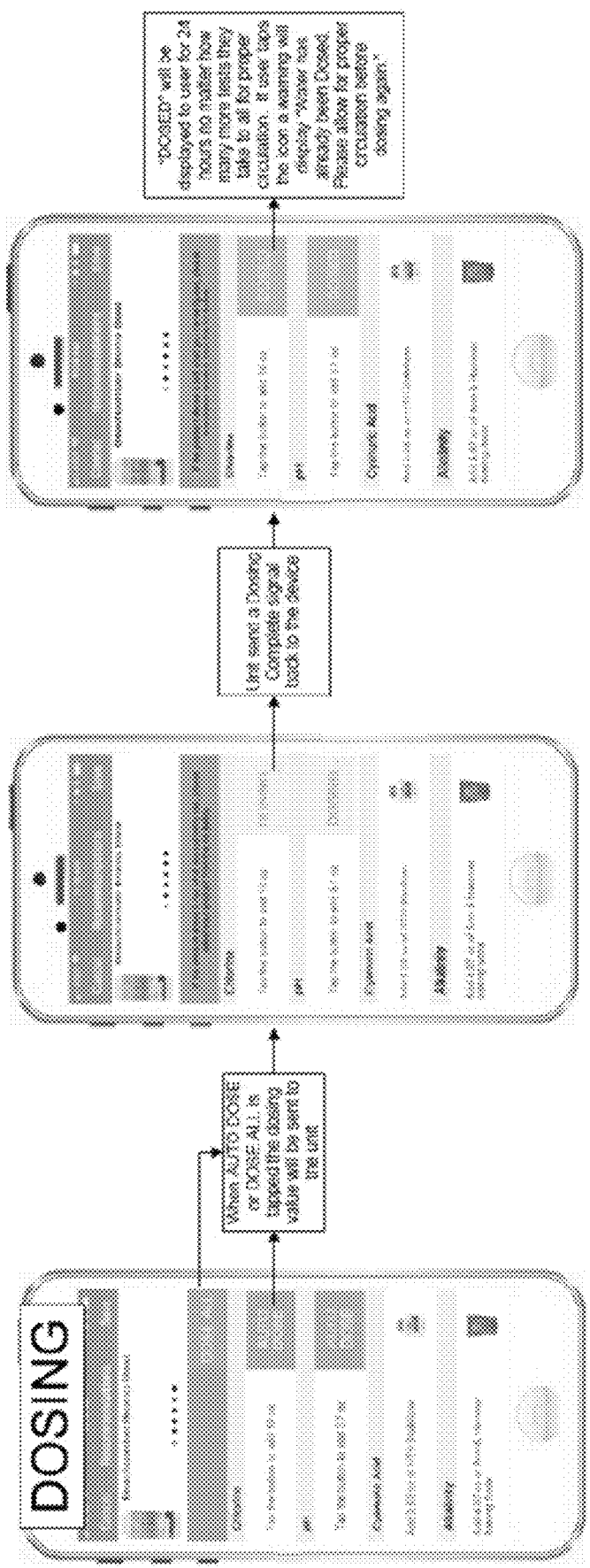
FIG. 18 is screen shots of one embodiment of the dosing of the APP.

The communication between the application and the controller includes the following information:
Controller Status information
Button status
Output On
Output Cancel
Bluetooth pairing (FIG. 17)
Priming or Dosing (FIG. 18)
Bottle low indication
Assigned chemicals for each pump
Required chemical dosage amounts for each chemical
Dosing status (FIG. 18)
Dosing progress percentage (FIG. 18)
Estimated chemical storage levels (FIG. 19)
Chemical storage bottle level reset Description of Operation of Bluetooth Peristaltic Pump Controller A test strip is dipped in the body of water to be tested. A picture of the strip is taken by the Phone App and compared to the database to determine the chemical levels of the water. The levels are then compared to the chemical level standards stored in the Phone App and if the difference is greater than a minimum threshold/value (e.g., a predetermined value which can be adjustable by the user) the Phone App will then calculate the amount of chemical to dose (FIG. 18). In one embodiment, the user inputs into the Phone App the volume of water to be treated, the chemicals to be dispensed, the concentration of each chemical, and the pump size in units/minute. In an embodiment, these values may be entered by the user during an initial configuration/setup (FIG. 17) and stored in a memory device of the phone for use during subsequent testing. With this information the Phone App uses a dosing algorithm (which can be adjustable by the user) that will take into account the current levels of all the measured values and determine the amount of each chemical to dispense. The Phone App has already been paired to a pump control module and the chemical locations have already been assigned. The Phone App takes the dosing information and sends it to the pump control module (FIG. 18). The Pump control module takes the information along with pump size and determines a period of time to run each pump so that each pump injects the determined amount of each chemical into the water to be treated. Each pump runs for the determined time while sending status information to the Phone App for display. When the determined time period to energize each pump is complete, each pump is turned off. The controller is now ready for the next dosing command. The pump controller has a button per pump used to cancel a dose command, prime the pump, or signal that the chemical bottle has been filled or changed. The Phone App will use the status information to notify the user (1) that a chemical in a bottle is getting low, (2) if there is an error in the pump controller, (3) the amount of the dose that has been applied, and (4) the type of pump or specific pump used in the system.

One embodiment of the functional parts list comprises:
1. Pump Housing/Enclosure
2. Bottle Housing/Enclosure—(Potentially Customer Supplied)
3. Chemical Storage Bottles with Lids—(Potentially Customer Supplied)
4. Chemical Tubing with Check Valves
5. Peristaltic Pumps
6. Indicator LED's
7. Switches
8. Wiring/Harnesses
9. Pump Control Circuit Card (Custom Card as described herein including a processor)
10. Bluetooth Circuit Card
11. Power Supply Process Flow Diagram FIG. 16

Figure 16:
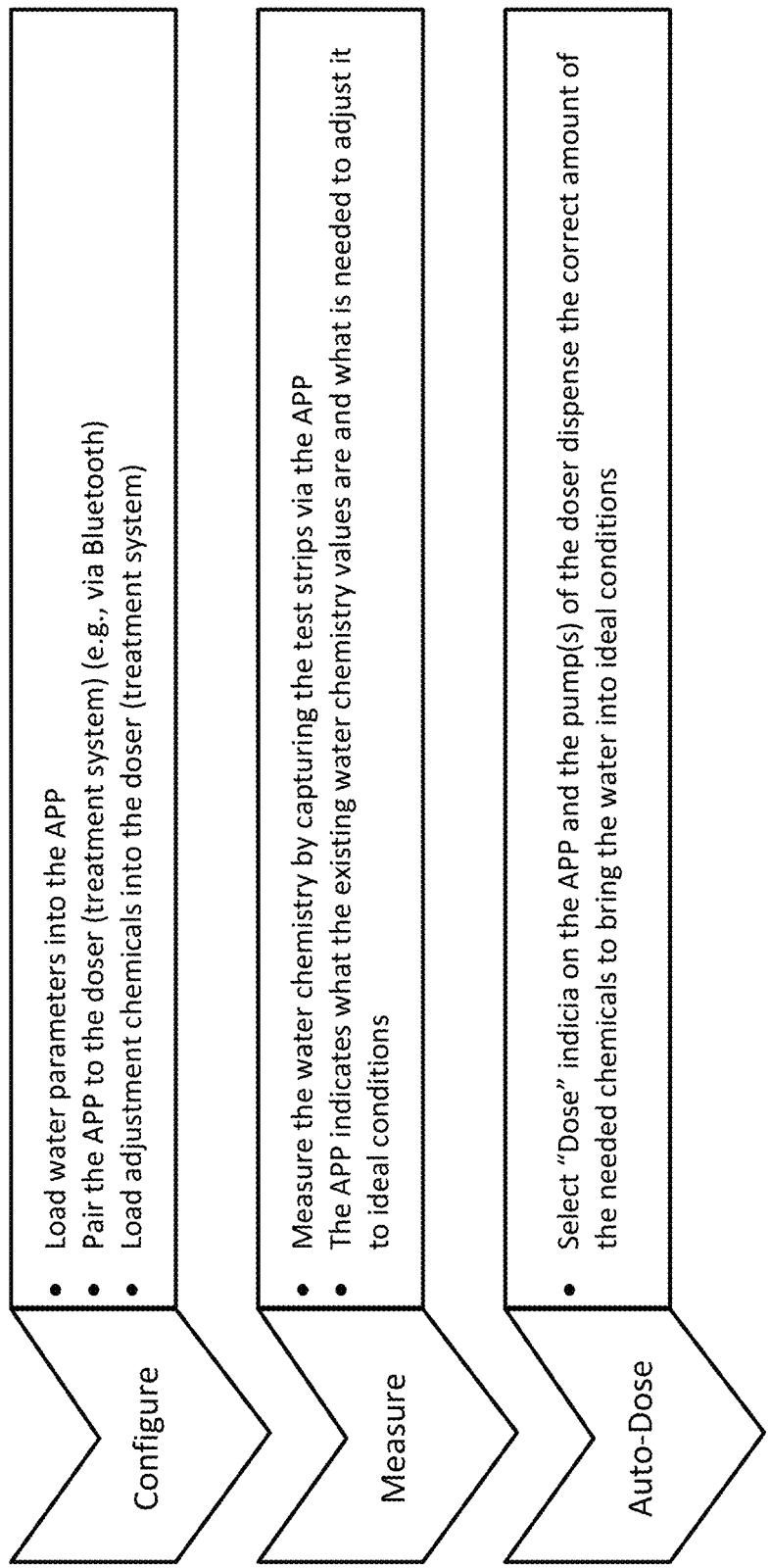
FIG. 16 is a process flow diagram of one embodiment of the APP.

In one option, the Measure Process Flow of the Process Flow Diagram of FIG. 16 can comprise measuring the water chemistry by some other means such as (1) sensors in the water which provide information to the user regarding the water chemistry or (2) manually testing by a test strip or chemical kit the water chemistry (e.g., the user could manually read a test strip to indicate the water chemistry or take a sample of the water and apply chemicals to the sample to indicate the water chemistry). In this option, the user would input the existing water chemistry values to the APP based on the sensors or manual testing and the APP would determine what is needed to adjust the water chemistry to ideal or preferred conditions. Alternatively or in addition, the user would determine what is needed to adjust the water chemistry to ideal or preferred conditions and input a treatment plan to the APP based on the sensors or manual testing.

Figure 19:
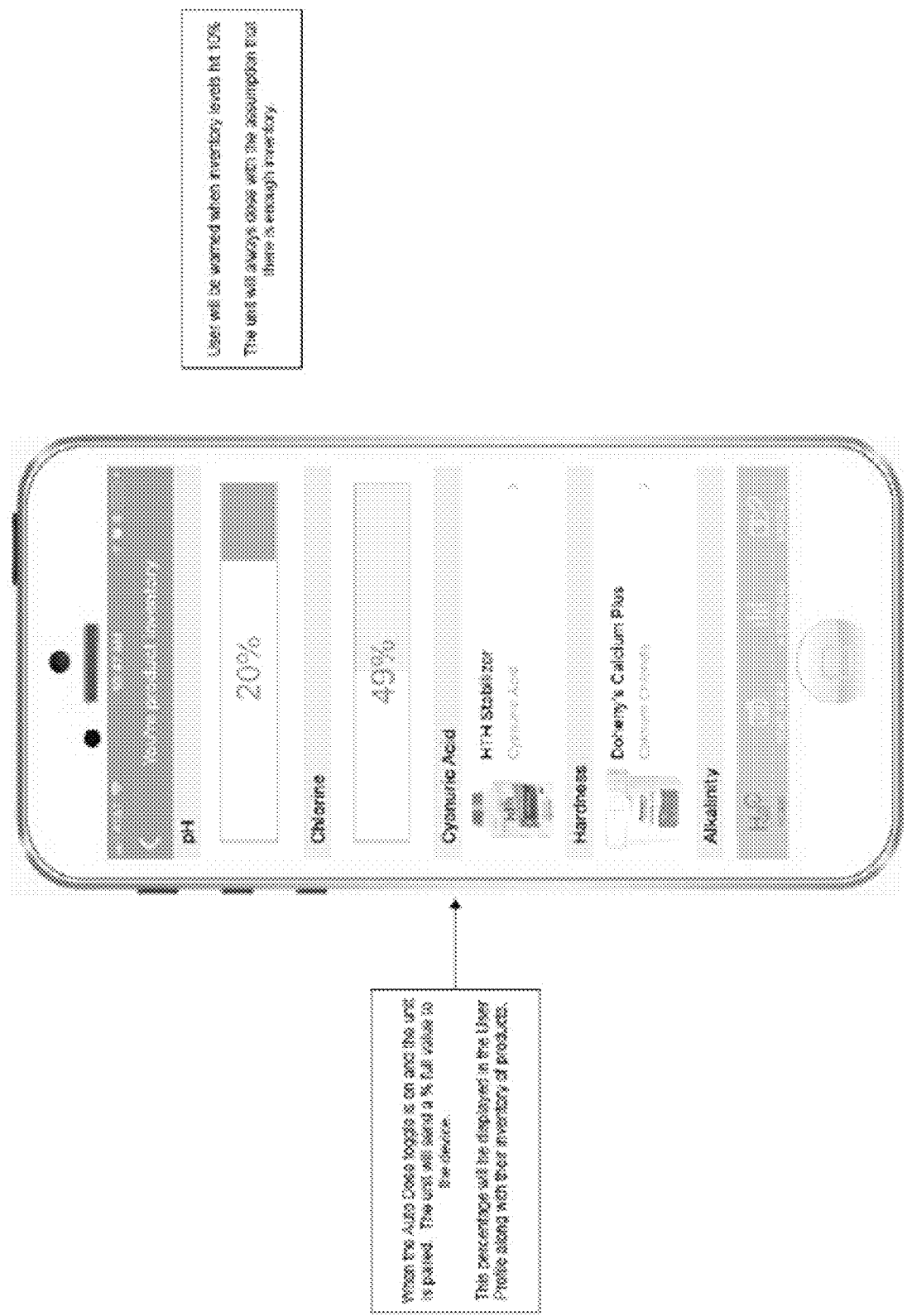
FIG. 19 is a screen shot of the product inventory displayed by the APP.

In one option, the volume of each treatment chemical in each container is input into the APP (FIG. 19). The APP keeps track of the volume amount of each chemical being dispensed to treat the water. The APP displays a percentage or volume amount of each chemical that remain in each container. The APP provides a notice to the user when the level of a chemical is at or below a predetermined minimum threshold/value (e.g., 10% or 4 ounces, etc.). Alternatively or in addition, the user can specify the minimum threshold/value. Alternatively or in addition, a container may have a volume sensor which indicates to the processor the volume amount of each chemical remaining in the container.

Test Strip

Figure 20:
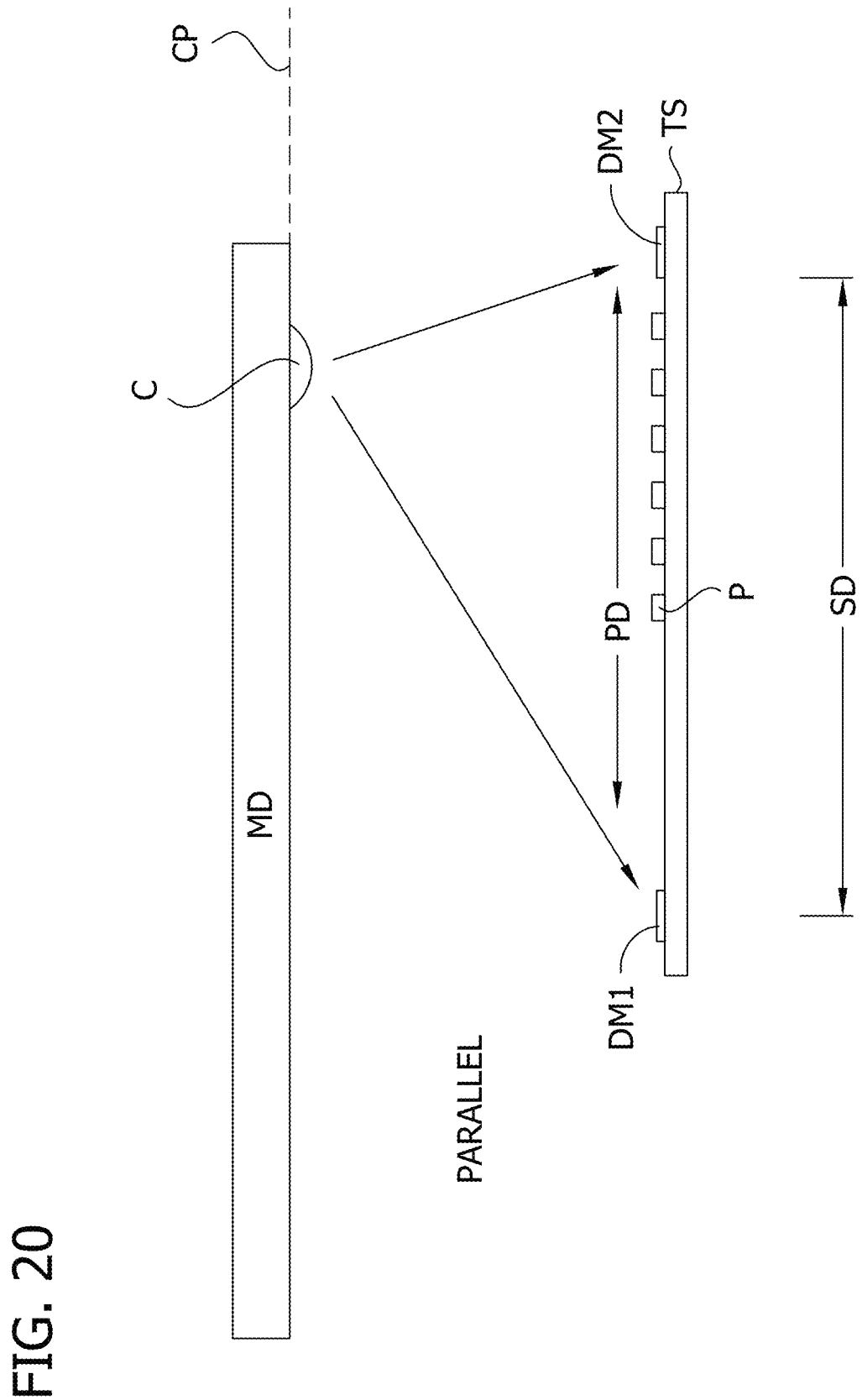
FIG. 20 is a side perspective view (not to scale) of a mobile device in a position which is substantially parallel to a test strip.
Figure 21:
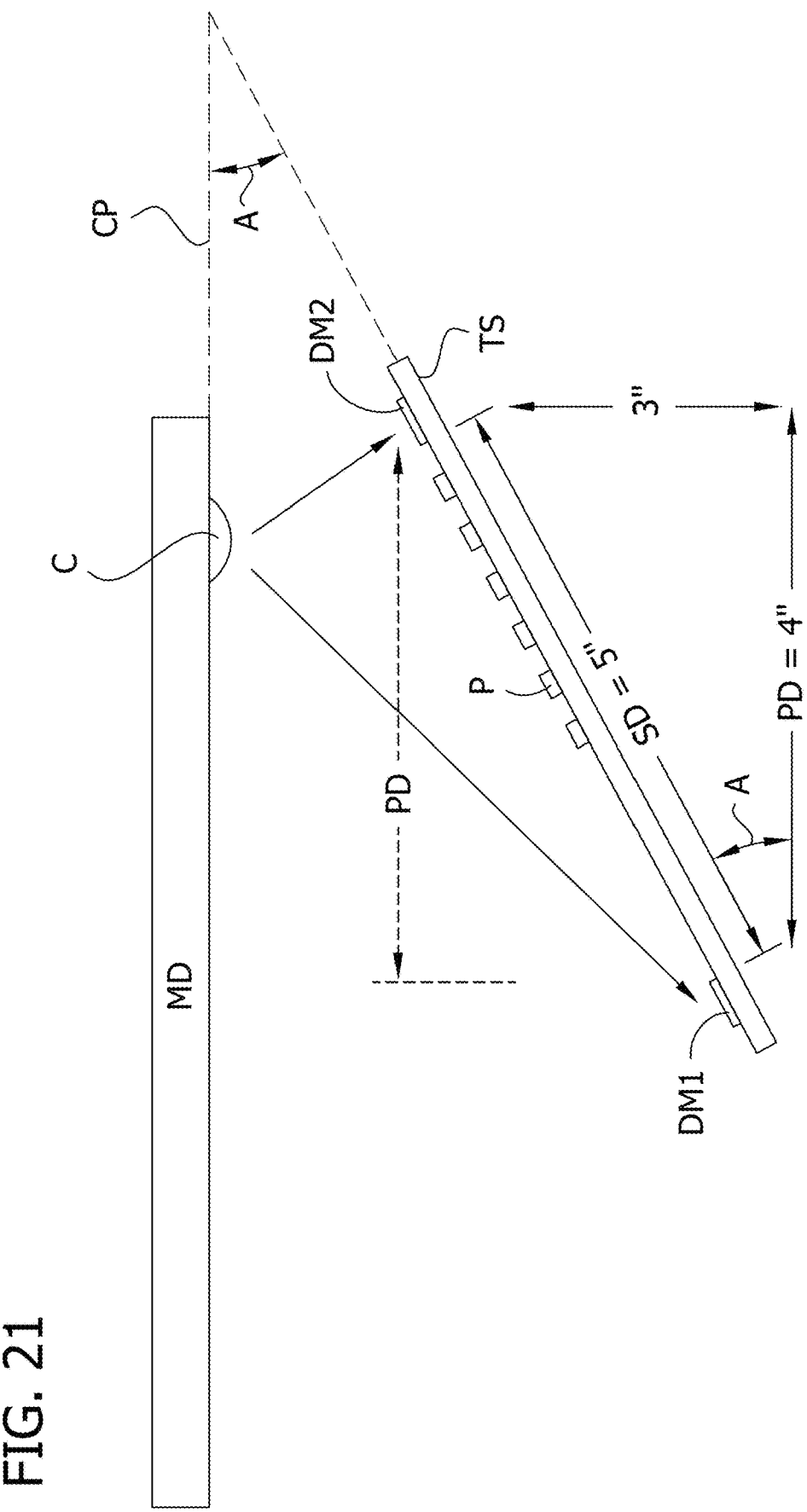
FIG. 21 is a side perspective view (not to scale) of a mobile device in a position which is at an angle A to a test strip.

Referring to FIGS. 20 and 21, in one form, the test strip TS includes data matrix codes DM1 and DM2 at each end of the strip TS. The APP (e.g., APP 116) of the mobile device MD includes instructions configured to measure a perceived distance PD between the data matrix codes DM1 and DM2. The perceived distance PD is used by the APP to determine the angle of the test strip TS relative to the angle of a camera plane CP of the camera C of the mobile device MD. As illustrated in FIG. 20, the test strip TS is approximately parallel to the camera C so that the perceived distance PD is approximately equal to a measured straight-line distance SD between the data matrix codes DM1 and DM2. In an embodiment, the test strip TS comprises test strip 102. Aspects of the test strip TS are further described herein and in U.S. patent application Ser. No. 29/650,177, incorporated by reference above.

In contrast, as illustrated in FIG. 21, the test strip TS is at an angle A to the camera C resulting in the perceived distance PD as viewed by the camera C is less than the actual straight-line measured distance SD between the data matrix codes DM1 and DM2. Since the location and spacing of each pad P relative to the data matrix codes DM1 and DM2 is known and the pads are located in a known region of interest, the APP includes instructions configured to determine the location of each pad P relative to the data matrix codes DM1 and DM2 based on perceived distance PD. When the test strip TS is at an angle A, the locations of each pad P in the camera's view relative to the data matrix codes DM1 and DM2 appear closer together and are proportional to the perceived distance PD as compared to the straight-line distance. In one form, the APP calculates the location of each pad P based on PD/SD or based on the angle A by using triangulation, although other forms of calculation may be used. Alternatively, it is also contemplated that a processor of a doser, as further described herein, may calculate the location of each pad P and/or that one or more images (pictures) or information about the image is uploaded to a cloud storage and a remote cloud APP may perform the calculations.

In one form, the APP includes instructions configured to determine the perceived distance PD and take an image of the test strip TS when the angle A is less than a preset angle amount, e.g., about 30-45 degrees, which would correspond to a minimum perceived distance PD. The preset angle amount depends on the spacing between pads P as well the other dimensions of the test strip TS. In one form, the preset angle amount excludes angles at which the pads P appear close to each other or colors between adjacent pads are difficult to discern or the white space between each pad is difficult to discern so that the APP has difficulty distinguishing between pads P and distinguishing between their different colors. For example, when the angle A is less than 30 degrees, the APP may be configured to alert a user using the camera C to read a test strip that the angle A is acceptable and that the camera has located the test strip TS and taken an image of the test strip TS. The user is alerted by a sound or other indication. When the angle A is greater than 30 degrees, the APP may be configured to alert a user using the camera C to read a test strip that the angle A is unacceptable and that the camera has not taken an image of the test strip TS. The user is alerted by a sound or other indication.

As a specific example, consider a test strip that is about 5.5 inches long, having data matrix codes DM1 and DM2 spaced at an actual straight-line distance SD of about 5 inches apart, and having pads spaced from code DM2 at a spacing of about 0.25 inches to about 3.5 inches from code DM2. When the test strip TS is approximately parallel to the camera plane CP as in FIG. 20, an image taken by the camera C views the perceived distance PD between the codes would be about 5 inches. In this scenario the perceived distance PD approximately equals the straight-line distance SD so that the APP would locate the pads P on the image based on the actual straight-line spacing of about 0.5 inches to about 3.5 inches from code DM2.

As another specific example which is illustrated in FIG. 21, consider a test strip that is about 5.5 inches long, having data matrix codes DM1 and DM2 spaced at an actual straight-line distance SD of about 5 inches apart, and having pads spaced from code DM2 at a spacing of about 0.25 inches to about 3.5 inches from code DM2. When the test strip TS is at an angle A of about 37 degrees to the camera plane CP, the perceived distance PD would be about 4 inches. In this scenario, distances between pads and distances between each pad and each code would be proportionally reduced by approximately 4/5 (perceived distance divided by the straight-line distance=PD/SD) so that the APP would locate the pads P based on a perceived spacing of about 0.2 inches to about 2.8 inches from code DM2. Note that in this example which is not to scale, the end of the test strip TS having code DM2 is closer to the camera plane CP than the other end having code DM1. As a result, a 3-4-5 right triangle is formed in this exemplary configuration between the perceived distance of 4 inches and the straight-line distance of 5 inches. Since the perceived distance of 4 inches is less than the straight-line distance of 5 inches, the pads P appear closer together and the locations of the pads P in the camera's view are compressed. Thus, the instructions to determine the location of each pad P relative to the codes DM1 and DM2 compensates for the compressed view by proportionally evaluating the difference between the perceived distance PD and the straight-line distance SD.

In one form, users are encouraged to place the test strip TS in the palm of their hand and hold their hand and camera parallel to each other.

In addition to providing spacing information, data matrix codes DM1 and DM2 can include embedded information relating to the test strip TS or other information such as expiration date of the test strip, manufacturer of the test strip, date of manufacture of the test strip, types of reagents of one or more of the pads, pad spacing or code spacing information, or other information. The APP may be configured to use the information in analyzing the strip. For example, if strips have various spacing between the data matrix codes DM1 and DM2, the codes may include spacing dimensions used by the APP to determine pad location. As another example, the APP may include branding information such as the strip manufacturer brand or a supplier brand in which as the APP would display the branding information after reading the test strip TS. Although embodiments described herein utilize data matrix codes, one of ordinary skill in the art will understand that any optical, machine-readable representation of data is within the scope of the present disclosure. Exemplary machine-readable representations of data include, but are not limited to, linear barcodes, 2D barcodes (e.g., QR codes, etc.), polar coordinate barcodes, and the like.

APP

As noted above, the APP (e.g., APP 116) may display branding information. Thus, the APP may be a universal APP or an umbrella APP which has all branding information embedded within it. Embedding all branding information within the APP enables the APP to read strips of any manufacturer and display the embedded branding information associated with the manufacturer of the read strip. In one form, all information is stored in a cloud storage and the data matrix codes DM1 and DM2 direct the APP to the cloud storage for obtaining information as well as storing the results of reading a test strip TS. Also, if a user group wants to share a test strip reading between two or more mobile devices, the APPs on the mobile devices can be synchronized and share information via the cloud storage.

In general, when the APP performs the calculations, the APP uses three types of information: (1) the test strip TS readings indicating the water condition, (2) the volume of the water to be treated by the doser, and (3) the concentration or strength of the chemicals which can be added to the water either by the doser or by the user manually. In an embodiment, the second and third types of information are input into the APP by a user. In response, the APP indicates to the doser or the user the amount of each chemical, if any, which should be added to adjust the water condition. In another embodiment, the second and third types of information are stored within the APP and/or downloaded from the cloud storage. For example, a default volume of water for a certain make and model pool may be stored within the APP and/or on the cloud storage and selection of that make and model pool by the user via the APP causes the APP to use that volume information. In another example, the APP and/or cloud storage includes an inventory of chemicals including the concentration or strength information and selection of a chemical by the user via the APP causes the APP to use that concentration or strength information.

Doser

In general, the doser is responsive to the APP. For example, the APP includes a button or field on a graphical user interface which, when selected by the user, activates the APP to transmit dosing information to the doser from the APP via Bluetooth indicating a volume, if any, of each chemical to be added to the water. The doser processor is programmed with details of each peristaltic pump, such as how much chemical is dispensed with each revolution of each pump. Thus, the doser processor knows how many revolutions of the pump are necessary to dispense the amount of chemical needed. In one form, the doser is calibrated at the factory and is an add-on component which is retrofitted to a spa or other water pumping system. In an embodiment, the doser comprises treatment system 130.

The processor of the doser (e.g., controller 138, processor 138A) and/or the mobile device 104 executing the APP (e.g., processor 106) may be provided with information regarding the volume of each chemical stored in each container of the doser. The processor of the doser and/or the mobile device executing the APP may keep track of the amount of each chemical dispensed and indicate to a user when a container needs to be refilled or chemical needs to be ordered. In one form, the APP may have a link to a supplier for assisting the user in re-ordering chemicals.

Calibration

In one form, the APP measures various color characteristics of each pad P to determine the change in color of the pad. For example, the APP may measure one or more of the following of each pad P:
RGB—red, green, blue
HSV—hue, saturation, value (brightness)
CMY—cyan, magenta, yellow Thus, no user calibration is needed. Alternatively, the APP may be programmed to take one or more images of one or more reference colors for use in determining the change in color of the pad. For example, the user may be instructed to take a reading from an unused test strip or from a test strip that has been dipped into a known liquid having known characteristics.

In one form, the user may indicate to the APP the type of lighting in which the APP is being used. For example, the user may indicate that the test strip is being evaluated in the sun or in the shade or under indoor lighting.

In one form, the APP is configured to take multiple images (e.g., 100 to 500 to 600 or more) and the APP is configured to evaluate colors of pads within each image based on light and dark gradients within each pad and/or based on the colors of a plurality of pixels from each pad. The APP is configured to find a certain number of readings (e.g., at least 4 or 5) for each strip as a whole or for each pad which are very similar (e.g., consistent reading within 80% to 95% or 99% or more).

Some mobile devices may have features which assist the APP in reading a test strip. For example, some devices have a lux meter within the camera so that the APP can use the lux value to assist in determining the color characteristics of each pad. Usually, the APP does not use a flash of the camera of the mobile device. However, it is contemplated that the APP may use the flash in certain conditions such as poor lighting.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium which is not a signal. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results may be attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A treatment system for treating a liquid wherein the treatment system is:
   for use with a test strip configured to indicate a chemical condition of a liquid,
   for use with a mobile device having a mobile processor, a mobile transmitter, a mobile memory device, and a mobile camera configured to read the test strip after the test strip has been in contact with the liquid, and
   for use with an APP comprising processor executable instructions configured to be stored in the mobile memory device and configured to be executed by the mobile processor, said instructions comprising instructions configured to:
     detect a first code at a first location on the test strip;
     detect a second code at a second location on the test strip, wherein a distance between the first code and the second code on the test strip comprises a code interval, wherein at least one of the first and second codes provides a point of reference;
     detect one or more pads each at separate locations on the test strip by utilizing the point of reference, the code interval, and a region of interest relative to the point of reference of the detected code, wherein the one or more pads are located within the region of interest;
     determine a color of each detected pad;
     determine an amount of each of one or more chemicals to be added to the liquid based on the determined color of each detected pad; and
     communicate the determined amount of each of the one or more chemicals to a treatment system via the mobile transmitter;
   said treatment system comprising:
     a treatment receiver configured to communicate with the mobile transmitter and configured to receive a signal from the mobile transmitter indicative of the determined amount of each chemical to be added to the liquid; and
     a treatment device configured to treat the liquid, the treatment device comprising:
       a treatment processor connected to and responsive to the treatment receiver, and
       a plurality of pumps selectively energized by the treatment processor to add the chemicals to the liquid as indicated by the received signal from the mobile transmitter;

wherein the treatment processor controls the plurality of pumps to add the determined amount of chemicals to the liquid to treat the liquid based on the determined color of the one or more pads.

2. The treatment system of claim 1, wherein the treatment receiver is configured to communicate with the mobile transmitter via a Bluetooth protocol.

3. The treatment system of claim 1, wherein the received signal from the mobile transmitter indicative of the determined amount of each chemical to be added to the liquid comprises determined ounces of each chemical, and wherein the treatment processor controls each of the plurality of pumps to turn a rotor thereof a predetermined number of revolutions to dispense the determined ounces of each chemical.

4. The treatment system of claim 1, wherein at least one of the mobile processor and the treatment processor updates a remaining volume value for each chemical based on the determined amount of each chemical dispensed to treat the liquid.

5. A system for use with a test strip configured to indicate a chemical condition of a liquid and for use with a mobile device having a mobile processor, a mobile transmitter, a mobile memory device, and a camera configured to read the test strip after the test strip has been in contact with the liquid, the system comprising:
   an APP comprising processor executable instructions configured to be stored in the mobile memory device and configured to be executed by the mobile processor, said instructions comprising instructions configured to:
      detect a code at a location on the test strip, wherein the code provides a point of reference;
      detect one or more pads each at separate locations on the test strip by utilizing the point of reference and a region of interest relative to the point of reference of the detected code, wherein the one or more pads are located within the region of interest;
      determine a color of each detected pad;
      determine an amount of each of one or more chemicals to be added to the liquid based on the determined color of each detected pad; and
      communicate the determined amount of each of the one or more chemicals to a treatment system via the mobile transmitter of the mobile device;
   said treatment system comprising:
      a treatment receiver configured to communicate with the mobile transmitter and configured to receive a signal from the mobile transmitter indicative of the determined amount of each chemical to be added to the liquid;
      a treatment device configured to treat the liquid, comprising:
         a treatment processor connected to and responsive to the treatment receiver, and
         a plurality of pumps selectively energized by the treatment processor to add chemicals to the liquid as indicated by the received signal from the mobile transmitter;
      wherein the treatment processor controls the plurality of pumps to add the determined amount of chemicals to the liquid to treat the liquid based on the determined color of the one or more pads;
      wherein the instructions configured to detect a code comprise instructions configured to:
         detect a first code at a first location on the test strip;
         detect a second code at a second location on the test strip, wherein a distance between the first code and the second code on the test strip comprises a code interval; and
      wherein the instructions configured to detect one or more pads comprise instructions configured to detect one or more pads each at separate locations on the test strip by utilizing the code interval and the region of interest.

6. The system of claim 5, wherein the locations of the first code and the second code each serve as a point defining a line along which the one or more pads are located on the test strip.

7. The system of claim 5, wherein the instructions configured to determine an amount of each of one or more chemicals to be added to the liquid are further based on a volume of the water to be treated and a concentration or a strength of the chemicals.

8. The system of claim 5, wherein the instructions configured to determine the color of each detected pad comprise determining at least one of:
   a red, green, blue (RGB) value of the pad;
   a hue, saturation, value (HSV) value of the pad; and
   a cyan, magenta, yellow (CMY) value of the pad.

9. The system of claim 5, the APP further comprising instructions configured to receive a user indication of a type of lighting illuminating the test strip.

10. A system for use with
   a mobile device having a processor, a transmitter, a memory device, and a camera configured to read a test strip after the test strip has been in contact with a liquid, and for use with
   a treatment device configured to treat the liquid, the treatment device comprising a treatment processor connected to and responsive to a treatment receiver and a plurality of pumps selectively energized by the treatment processor to add chemicals to the liquid as indicated by a received signal from the transmitter, wherein the treatment processor controls the plurality of pumps to add chemicals to the liquid to treat the liquid based on the determined color of the one or more pads on the test strip;
   the system comprising:
   a test strip having one or more pads configured to indicate a chemical condition of a liquid after the pads have been in contact with the liquid, said test strip having one or more codes thereon providing a point of reference for determining the position of each of the one or more pads; and
   an APP comprising processor executable instructions configured to be stored in the memory device and configured to be executed by the processor of the mobile device, said instructions comprising:
   instructions configured to:
      detect a code at a location on the test strip, wherein the code provides a point of reference;
      detect one or more pads each at separate locations on the test strip by utilizing the point of reference and a region of interest relative to the point of reference of the detected code wherein the one or more pads are located within the region of interest;
      determine a color of each detected pad;
      determine an amount of each of one or more chemicals to be added to the liquid based on the determined color of each detected pad; and
      communicate the determined amount of each of the one or more chemicals to the treatment device via the transmitter of the mobile device;

wherein the code includes embedded information including a date indicative of an expiration date of the test strip, a date of manufacture of a test strip, manufacturer of the test strip, types of reagents of one or more of the pads, pad spacing dimensions, code spacing dimensions, or branding, and the APP includes instructions configured to notify a user of the embedded information.

11. The treatment system of claim 10 wherein the APP includes instructions configured to store determined color data in a memory device and instructions configured to generate a report from the stored data.

12. The treatment system of claim 10 wherein the APP includes instructions configured to calculate treatment information based on the determined color of the pads of the test strip.

13. The treatment system of claim 10 wherein the test strip comprises:
a substrate;
one or more color-sensitive pads on the substrate for sensing a chemical condition of the liquid when in contact with the liquid and providing a color in response to the sensed chemical condition; and
two or more codes on the substrate.

14. The treatment system of claim 13 wherein at least one of the following:
the two or more codes comprises first and second codes and further comprising a positioning algorithm implemented by the APP configured to detect the one or more codes which indicate two points on a line along which the one or more pads are located; and
the two or more codes comprises first and second codes and further comprising instructions for executing an algorithm implemented by the APP to determine a position of the one or more pads based on a difference between a perceived distance between the first and second codes and a straight-line distance between the first and second codes.

15. The system of claim 13 wherein the first and second codes each comprise at least one of a bar code, a QR code, and a data matrix code.

16. A system for use with a mobile device having a mobile processor, a transmitter, a memory device, and a camera configured to read a test strip after the test strip has been in contact with a liquid, the system comprising:
a treatment device configured to treat the liquid, the treatment device comprising:
a treatment processor connected to and responsive to a treatment receiver, and
a plurality of pumps selectively energized by the treatment processor to add chemicals to the liquid as indicated by a received signal from the transmitter of the mobile device,
wherein the treatment processor controls the plurality of pumps to add chemicals to the liquid to treat the liquid based on the determined color of the one or more pads on the test strip;
a test strip having one or more pads configured to indicate a chemical condition of a liquid after the pads have been in contact with the liquid, said test strip having one or more codes thereon providing a point of reference for determining the position of each of the one or more pads; and
an APP comprising processor executable instructions configured to be stored in the memory device of the mobile device and configured to be executed by the mobile processor, said instructions comprising instructions configured to:
detect a code at a location on the test strip, wherein the code provides a point of reference;
detect one or more pads each at separate locations on the test strip by utilizing the point of reference and a region of interest relative to the point of reference of the detected code wherein the one or more pads are located within the region of interest;
determine a color of each detected pad;
determine an amount of each of one or more chemicals to be added to the liquid based on the determined color of each detected pad; and
communicate the determined amount of each of the one or more chemicals to the treatment device via the transmitter of the mobile device;
wherein the received signal from the transmitter of the mobile device indicative of the determined amount of each chemical to be added to the liquid comprises determined ounces of each chemical, and wherein the treatment processor controls each of the plurality of pumps to turn a rotor thereof a predetermined number of revolutions to dispense the determined ounces of each chemical.

17. The system of claim 16, wherein at least one of the mobile processor and the treatment processor updates a remaining volume value for each chemical based on the determined amount of each chemical dispensed to treat the liquid.

18. The system of claim 16, wherein the instructions configured to determine an amount of each of one or more chemicals to be added to the liquid are further based on a volume of the water to be treated and a concentration or a strength of the chemicals.

19. The system of claim 16, wherein the instructions configured to determine the color of each detected pad comprise determining at least one of:
a red, green, blue (RGB) value of the pad;
a hue, saturation, value (HSV) value of the pad; and
a cyan, magenta, yellow (CMY) value of the pad.

20. The system of claim 16, the APP further comprising instructions configured to receive a user indication of a type of lighting illuminating the test strip.

* * * * *